United States Patent
Chesser et al.

(10) Patent No.: US 8,991,765 B1
(45) Date of Patent: Mar. 31, 2015

(54) SATELLITE PREDICTIVE AVOIDANCE SYSTEM

(75) Inventors: Douglas Edward Chesser, Laguna Niguel, CA (US); Mario Pio Alleva, Placitas, NM (US); Manuel Beltran, Santa Ana, CA (US); Paul H. Smith, Auburn, WA (US)

(73) Assignee: The Boeing Company, Chicago, IL (US)

( * ) Notice: Subject to any disclaimer, the term of this patent is extended or adjusted under 35 U.S.C. 154(b) by 276 days.

(21) Appl. No.: 13/438,176

(22) Filed: Apr. 3, 2012

(51) Int. Cl.
*B64G 3/00* (2006.01)
*B64G 1/24* (2006.01)

(52) U.S. Cl.
CPC .................................... *B64G 1/242* (2013.01)
USPC ..................................... 244/158.4; 244/158.6

(58) Field of Classification Search
USPC ........................................... 244/158.4, 158.6
See application file for complete search history.

(56) References Cited

U.S. PATENT DOCUMENTS

2008/0254749 A1* 10/2008 Ashkenazi et al. ............. 455/69

OTHER PUBLICATIONS

"Joint Airspace Management and Deconfliction (JASMAD)." Air Force Research Laboratory, Jan. 2009.*
Kramer, Steven. "The Impact of Predictive Avoidance Restrictions on Astronomical Observatories." Institute for Defense Analyses Science & Technology Policy Institute, Nov. 2010.*
Alfano et al., "Predictive Avoidance for Ground-Based Laser Illumination", Journal of Spacecraft and Rockets, vol. 37, No. 1, Jan. 2000, pp. 122-128.
"Illumination of Objects in Space by Lasers", Department of Defense Instruction (for Official Use Only), No. 3100.11, Mar. 2000, pp. 1-11.

* cited by examiner

*Primary Examiner* — Brian M O'Hara
*Assistant Examiner* — Michael Kreiner
(74) *Attorney, Agent, or Firm* — Yee & Associates, P.C.

(57) ABSTRACT

A method and apparatus for generating avoidance data. Strips are generated for a path of a space object. The strips are positioned relative to the path of the space object. The strips have parameters that obscure an identification of the path of the space object to form the avoidance data.

25 Claims, 15 Drawing Sheets

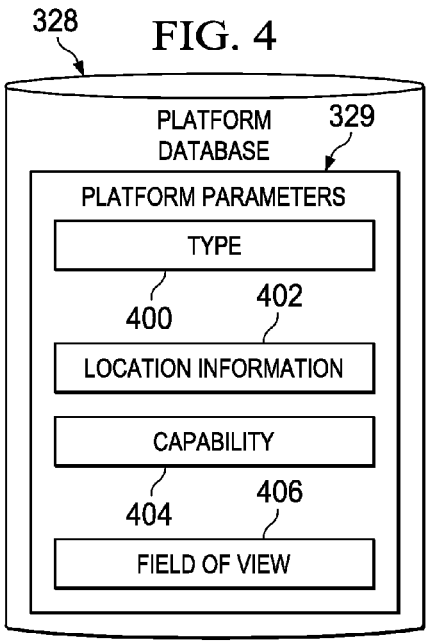
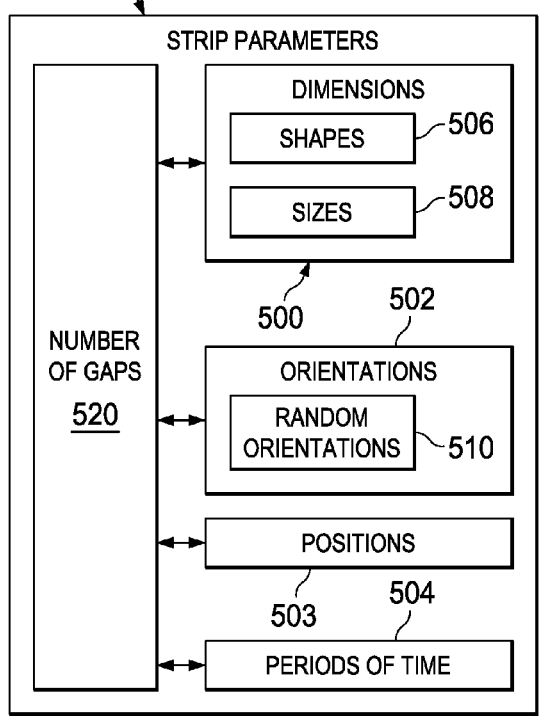
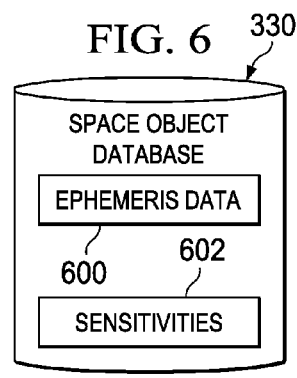

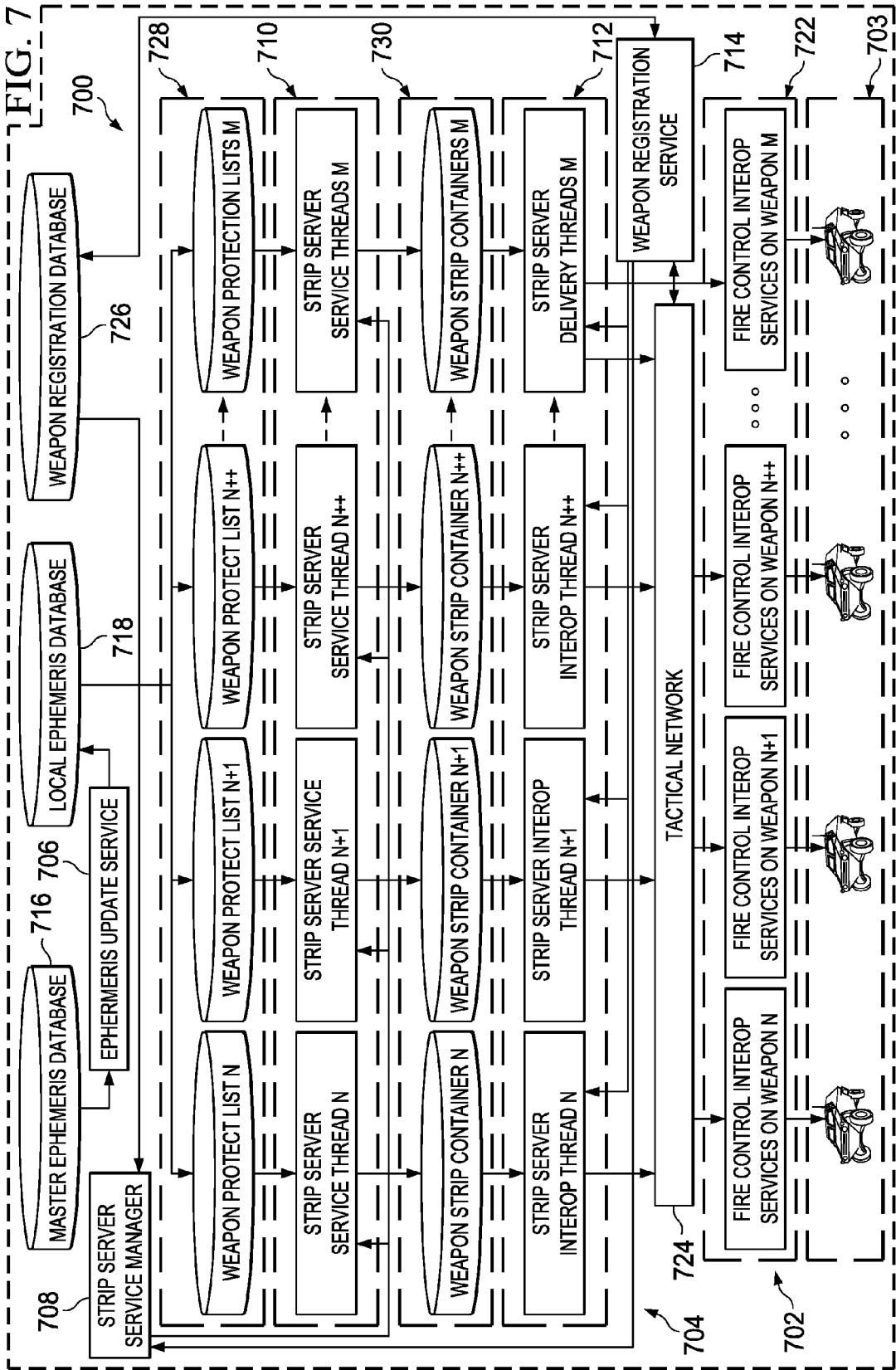

FIG. 19
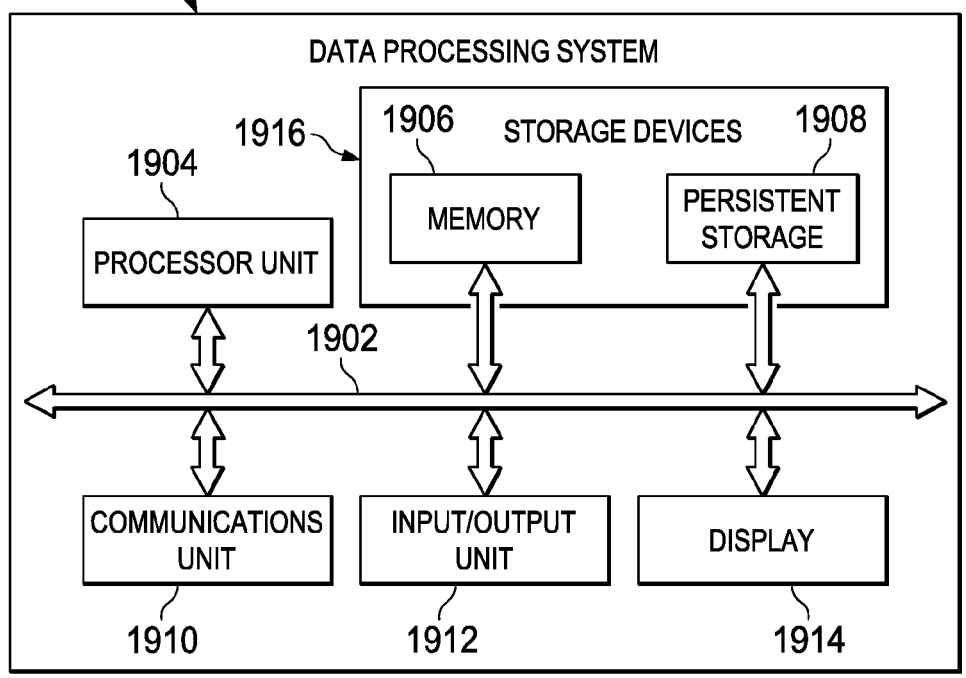
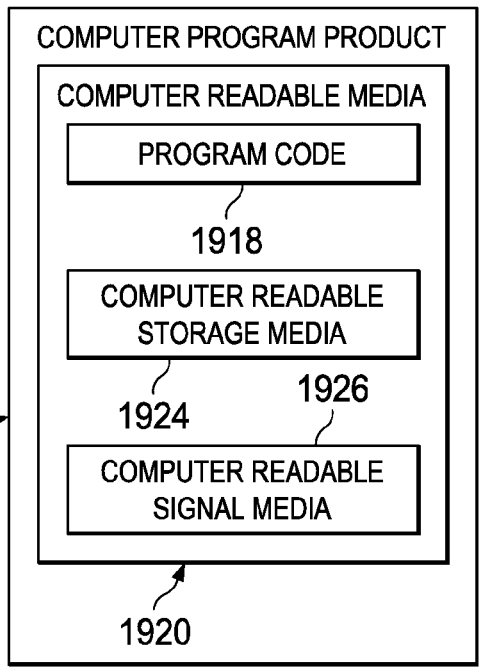

US 8,991,765 B1

SATELLITE PREDICTIVE AVOIDANCE SYSTEM

BACKGROUND INFORMATION

1. Field

The present disclosure relates generally to satellites and, in particular, to a method and apparatus for avoiding the illumination of satellites by directed energy sources.

2. Background

Lasers are used for many different purposes. For example, lasers are used as weapons, as a communications medium, and for other types of purposes. For instance, a laser may be directed from a location on the ground or on the ocean toward a target object in the atmosphere or in outer space. This target object may be, for example, a missile or enemy aircraft. In this instance, the laser is configured to damage or destroy the target object. In another example, the target object may be an aircraft, and the laser may be used to establish communications with the aircraft.

In yet another example, a laser beam may be emitted for satellite ranging. In this example, a laser beam may be directed toward a satellite equipped with a reflector. Measurements may be made to identify accuracy of orbit, calibrate radar telemeters, and perform other operations. With these and other uses of lasers, laser beams may inadvertently reach a satellite that is not a desired target object.

Inadvertent illumination of satellites by a laser beam may cause damage to those satellites. Many satellites may carry sensors that are sensitive to the wavelengths used by the laser beam. Illumination of these sensors by the laser beam may reduce the performance of the sensors or may render the sensors inoperative.

As a result, the United States government and other entities have rules and policies regarding the use of lasers that may be pointed towards the sky. For example, an operator of a laser may be required to provide one or more locations in the sky where a laser beam will be emitted, as well as specific times when the laser will be used in these locations. A response is received indicating whether permission is granted for the particular locations and times. This type of emission, however, may require providing the information weeks or days in advance.

Although this type of process may be useful for scientific and other planned activities, obtaining permission in this manner is impractical when the laser beam is emitted from a platform for use in a military mission. Oftentimes, targets may only be known seconds or minutes before the laser is needed. Therefore, it would be desirable to have a method and apparatus that takes into account at least some of the issues discussed above, as well as other possible issues.

SUMMARY

In one illustrative embodiment, a method for generating avoidance data is presented. Strips are generated for a path of a space object. The strips are positioned relative to the path of the space object. The strips have parameters that obscure an identification of the path of the space object to form the avoidance data.

In another illustrative embodiment, a space object avoidance system comprises an avoidance system. The avoidance system is configured to generate strips for a path of a space object and position the strips relative to the path of the space object. The strips have parameters that obscure an identification of the path of the space object to form avoidance data.

In yet another illustrative embodiment, a method for operating a platform is presented. Avoidance data is received defining strips generated for a path of a space object. The strips are positioned relative to the path of the space object, and the strips have parameters that obscure an identification of the path of the space object to form the avoidance data. The platform is operated using the avoidance data.

In still another illustrative embodiment, an apparatus comprises a platform. The platform is configured to receive avoidance data defining strips generated for a path of a space object. The strips are positioned relative to the path of the space object, and the strips have parameters that obscure an identification of the path of the space object to form the avoidance data. The platform is further configured to operate using the avoidance data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 4 is an illustration of a block diagram of a platform database in accordance with an illustrative embodiment;

FIG. 5 is an illustration of a block diagram of avoidance data in accordance with an illustrative embodiment;

FIG. 6 is an illustration of a block diagram of a space object database in accordance with an illustrative embodiment;

FIG. 7 is an illustration of an avoidance system and a client fire control system in accordance with an illustrative embodiment;

FIG. 19 is an illustration of a data processing system in accordance with an illustrative embodiment.

DETAILED DESCRIPTION

The illustrative embodiments recognize and take into account one or more different considerations. For example, the illustrative embodiments recognize and take into account that sending information about the path of a space object, such as a satellite, may be infeasible in many cases. For example, the locations and paths of many satellites operated by a government or other entity may be considered highly classified. As a result, sending this information to platforms for use on the battlefield or to unclassified systems not allowed to process classified information may be infeasible because of the prohibitions on where such information can be sent.

Further, the illustrative embodiments recognize and take into account that requesting clearance to send directed energy into the sky ahead of the time at which the directed energy is to be sent may also be infeasible. For example, the illustrative embodiments recognize and take into account that military platforms in the field often do not have time to wait hours, days, or weeks for permission to send directed energy into the sky. Oftentimes, the use of these platforms may be needed immediately or in minutes, rather than in days or weeks.

Thus, the illustrative embodiments provide a method and apparatus for managing the sending of directed energy into the sky. In one illustrative embodiment, a method is present for generating avoidance data. Strips for a path of a space object are generated. The strips are positioned relative to the path of the space object. The strips have parameters that obscure an identification of the path of the space object to form the avoidance data.

This avoidance data may be sent to a platform for use. The platform may then send directed energy toward the sky into outer space using the avoidance data. This avoidance data, however, is configured to obscure an identification of a path of a space object. As a result, concerns about the security of the platform may be reduced with the use of this avoidance data.

Figure 1:
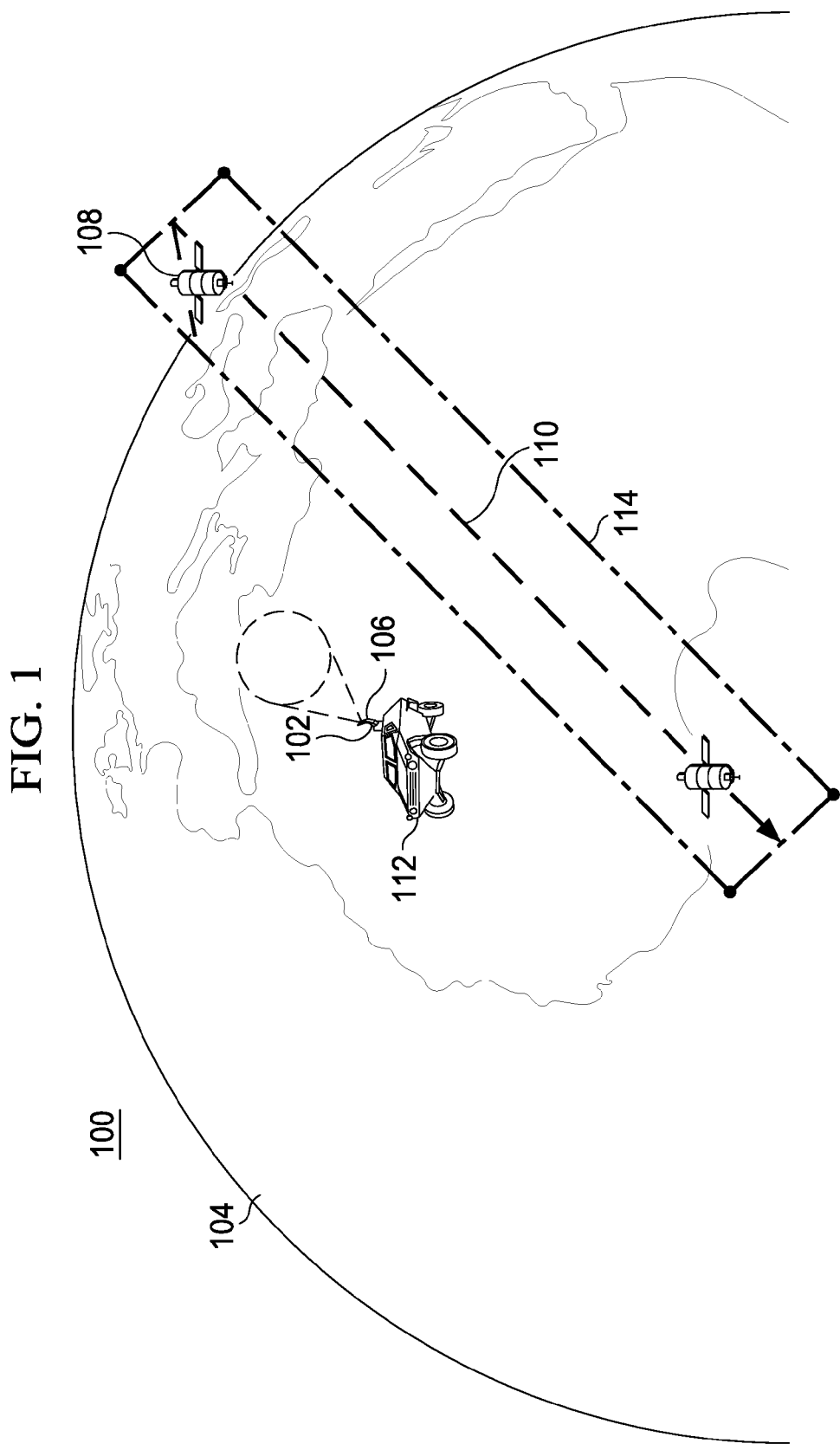
FIG. 1 is an illustration of a space object avoidance environment in accordance with an illustrative embodiment.

With reference now to the figures and, in particular, with reference to FIG. 1, an illustration of a space object avoidance environment is depicted in accordance with an illustrative embodiment. In this illustrative example, space object avoidance environment 100 comprises platform 102 located on Earth 104. Platform 102 includes laser system 106. Laser system 106 is configured to project laser beams into the atmosphere or into outer space.

In operating laser system 106, it is desirable to avoid space objects, such as satellite 108. Satellite 108 has orbital path 110, which extends around Earth 104 in these illustrative examples. Depending on the particular implementation, orbital path 110 may result in satellite 108 having a stationary position relative to a location on Earth 104 when orbital path 110 takes the form of a geosynchronous orbit.

Platform 102 may include fire control client 112. Fire control client 112 is configured to control the operation of laser system 106 such that laser system 106 does not project energy in a manner that illuminates satellite 108. In these illustrative examples, zones in which laser system 106 should not fire may take the form of keep-out zones. These zones may appear as strips, such as strip 114. In these illustrative examples, strip 114 has a three-dimensional form. For example, strip 114 may be spherical, curved, or have some other suitable shape.

In these illustrative examples, fire control client 112 may receive information about strip 114 such that the operation of laser system 106 avoids illuminating satellite 108 from the information received by fire control client 112 about strip 114.

In these illustrative examples, strip 114 may be configured in a manner that avoids an identification of the location of satellite 108. In one illustrative example, multiple strips may be used in place of strip 114 in which those strips have parameters that obscure identification of a location of satellite 108. In other words, the information is generated in such a manner that an identification of orbital path 110 is obscured and cannot be easily identified. With orbital path 110 being obscured, the location of satellite 108 also may be obscured. In other words, the information sent to platform 102 does not have the form of strip 114.

Figure 2:
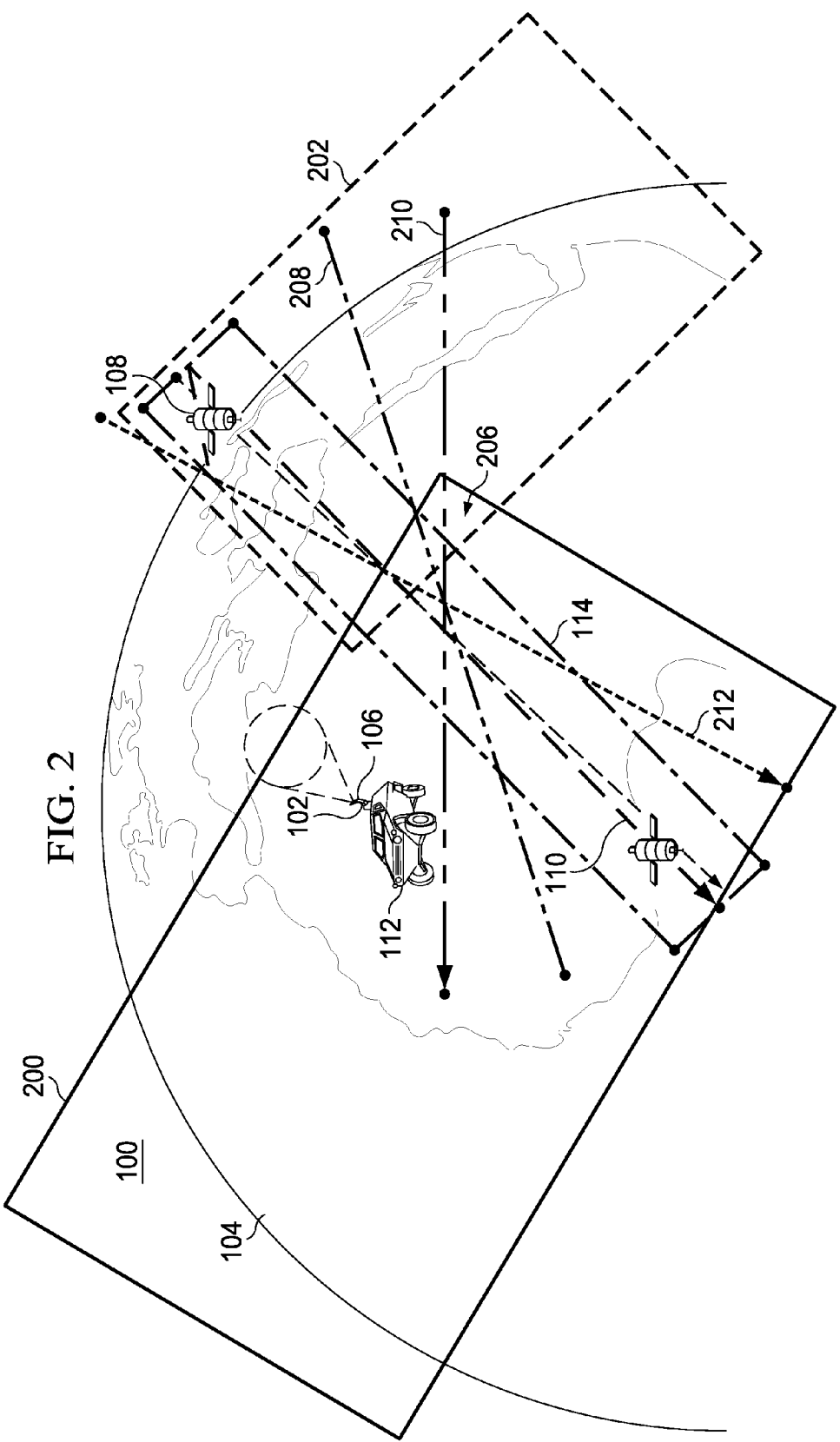
FIG. 2 is an illustration of strips used to avoid illumination and for the locating of a satellite in accordance with an illustrative embodiment.

Turning now to FIG. 2, an illustration of strips used to avoid illumination and for the locating of a satellite is depicted in accordance with an illustrative embodiment. In this depicted example, strip 200 and strip 202 are sent to fire control client 112 for use in controlling the operation of laser system 106. Information about these strips is sent instead of about strip 114 in FIG. 1.

The selection of strip 200 and strip 202 is performed such that orbital path 110 is obscured. In this manner, a location of satellite 108 may be obscured. In other words, the location of satellite 108 may be unidentifiable as a result of obscuring an identification of orbital path 110 from strip 200 and strip 202. In these illustrative examples, strip 200 and strip 202 have different spherical dimensions and orientations as viewed in a two-dimensional plane.

Further, these strips overlap each other in region 206. The combination of at least one of the orientation of a strip, the dimensions of a strip, and the overlap of a strip may obscure the position and the ability to identify the position of satellite 108.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

In these illustrative examples, strip 200 and strip 202 have periods of time during which these strips are valid. These periods of time may be the same or different. If the periods of time are different, some overlap may be present between the periods of time of validity for strip 200 and strip 202.

In this illustrative example, many different possibilities are present for orbital paths of satellite 108 based on strip 200 and strip 202. For example, in addition to orbital path 110, which is the actual orbital path of satellite 108; orbital path 208, orbital path 210, and orbital path 212 are some examples of other orbital paths that may be possibilities for satellite 108 based on strip 200 and strip 202. Of course, additional strips in addition to strip 200 and strip 202 may be used. As the number of strips increases, the dimensions and orientations of these strips may increase the number of possibilities for orbital paths in a manner that obscures identifying the location of satellite 108.

Figure 3:
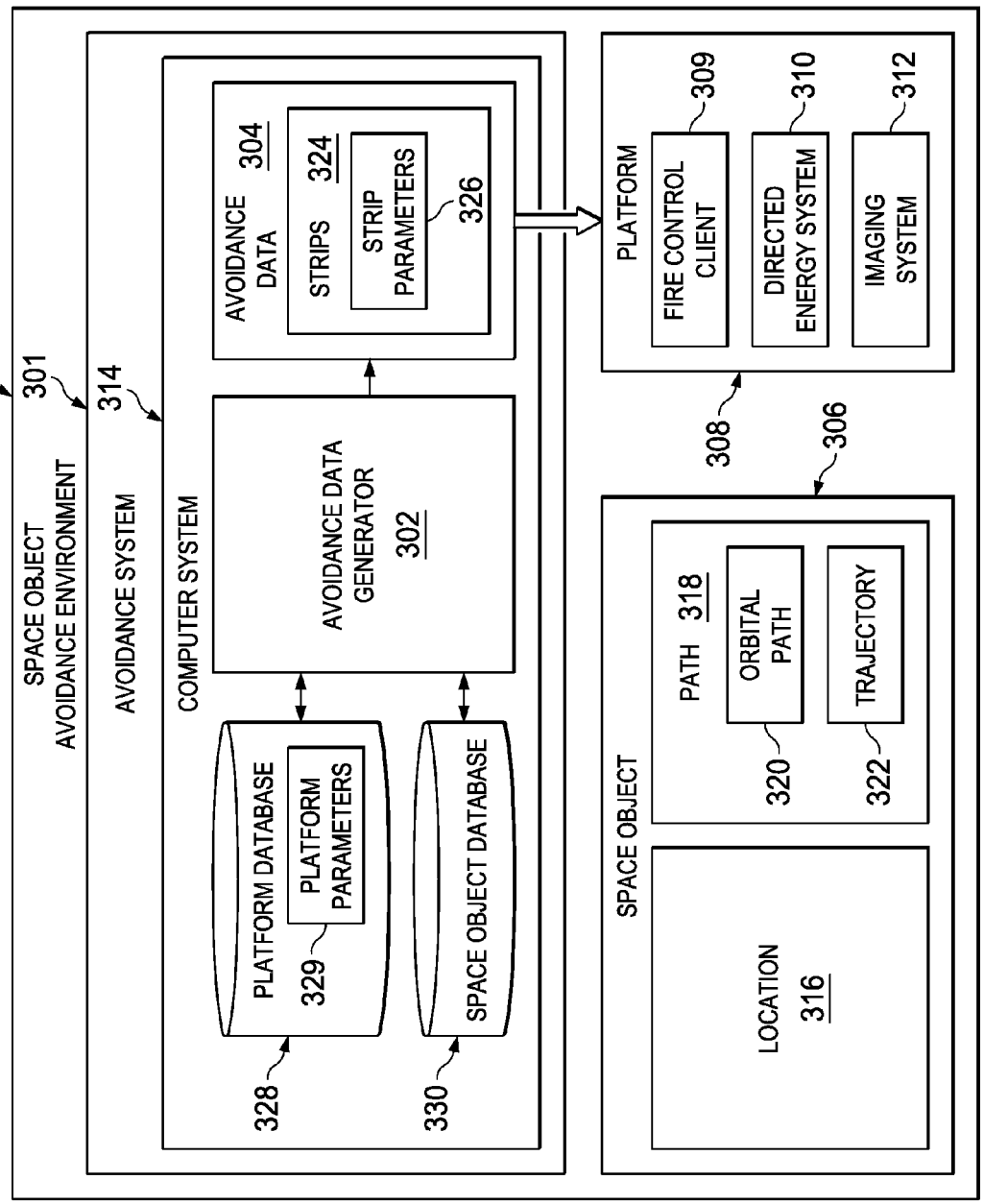
FIG. 3 is an illustration of a block diagram of a space object avoidance environment in accordance with an illustrative embodiment.

With reference now to FIG. 3, an illustration of a block diagram of a space object avoidance environment is depicted in accordance with an illustrative embodiment. Space object avoidance environment 100 in FIG. 1 is an example of one implementation for space object avoidance environment 300 in FIG. 3.

In this illustrative example, avoidance data generator 302 in avoidance system 301 generates avoidance data 304 for space object 306. Avoidance data 304 is sent to platform 308 for use in operating platform 308. In particular, platform 308 may be operated using avoidance data 304 to avoid being directed toward space object 306. In these illustrative examples, avoidance data 304 is received and used by fire control client 309 in operating platform 308. Avoidance system 301 and fire control client 309 each may be implemented using hardware, software, or a combination of the two.

In these illustrative examples, platform 308 may take a number of different forms. For example, without limitation, platform 308 may be a stationary platform, a mobile platform, a land-based structure, an aquatic-based structure, and/or any other suitable type of platform. For example, platform 308 may be, for example, without limitation, a submarine, a personnel carrier, a truck, a tank, a surface ship, a building, an observatory, and/or some other suitable type of platform. In these illustrative examples, platform 308 may include at least one of directed energy system 310 and imaging system 312.

Directed energy system 310 may take a number of different forms. For example, without limitation, directed energy system 310 may include at least one of a laser system, a microwave system, a rail-gun system, and other suitable types of systems that are configured to direct energy at a target.

Imaging system 312 is a system configured to generate images. These images may be still images or videos. Imaging system 312 may be, for example, without limitation, a visible light camera, an infrared light camera, a telescope, and other suitable types of imaging systems.

In these illustrative examples, avoidance system 301 may generate avoidance data 304 in a manner such that avoidance data 304 is sent to platform 308 for use in a desired amount of time. In other words, the amount of time to obtain avoidance data 304 from avoidance system 301 to operate platform 308 may be less than other currently used systems that may not meet the operating needs of platform 308.

In one illustrative example, avoidance data generator 302 may be implemented in computer system 314. Computer system 314 is one or more computers. When more than one computer is present in computer system 314, those computers may communicate with each other over a computer network or data link.

When components in avoidance data generator 302 are implemented in software, the operations performed by the components may be implemented in program code configured to be run on a processor unit. When hardware is employed, the hardware may include circuits that operate to perform the operations in the components.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

In these illustrative examples, avoidance data generator 302 generates avoidance data 304 for space object 306 in a manner that obscures an ability to identify location 316, path 318, or both for space object 306 from avoidance data 304. In these illustrative examples, path 318 may be, for example, orbital path 320, trajectory 322, or some other suitable type of path. Orbital path 320 is a path that space object 306 takes around the Earth. Trajectory 322 may be some other suitable path or may be a vector for the current movement of space object 306. Trajectory 322 may change frequently if space object 306 is a spacecraft rather than a satellite or a space station.

In these illustrative examples, avoidance data generator 302 identifies path 318 for space object 306. Based on path 318, avoidance data generator 302 generates strips 324 for path 318 of space object 306. Strips 324 are positioned relative to path 318 of space object 306. In these illustrative examples, strips 324 are hemispherical in shape.

As depicted, strips 324 have strip parameters 326. Strip parameters 326 for strips 324 are configured such that strip parameters 326 obscure path 318 of space object 306. When path 318 of space object 306 is obscured, location 316 of space object 306 may then be unidentifiable. In other words, strips 324 are configured such that strips 324 cannot be used to easily identify path 318 of space object 306. As a result, location 316 of space object 306 may not be easily identifiable.

In these illustrative examples, strips 324 with strip parameters 326 form avoidance data 304. After avoidance data 304 is generated, avoidance data 304 is transmitted to platform 308. In particular, avoidance data 304 is sent to fire control client 309 in platform 308.

Avoidance data 304 may be generated in response to an event. The event may be a periodic event or a non-periodic event. For example, avoidance data 304 may be generated every 10 minutes, every hour, every three hours, or after some other suitable period of time. In other illustrative examples, avoidance data 304 may be generated in response to an event, such as a request for avoidance data 304 from platform 308, a registration of platform 308 with avoidance data generator 302, or some other suitable event.

In these illustrative examples, avoidance data 304 may be generated for specific platforms, such as platform 308, using platform database 328 in avoidance system 301. Platform database 328 is a collection of information about platform 308. For example, platform parameters 329 contain information about platform 308. This information in platform parameters 329 is used to generate avoidance data 304 specifically for platform 308. In other words, avoidance data 304 for space object 306 may be tailored specifically for platform 308. As such, avoidance data 304 may be different for another platform other than platform 308.

Space object database 330 in avoidance system 301 includes information about a space object, such as space object 306. Space object database 330 may be used by avoidance system 301 to determine whether avoidance data 304 should be generated for space object 306. Depending on the capabilities of platform 308, avoidance data 304 may be unnecessary for space object 306 for platform 308. For example, the configuration of directed energy system 310 for platform 308 may not cause an effect on space object 306. As a result, avoidance data 304 is not necessary for space object 306 in that instance.

In this manner, data about the positioning and paths of satellites and other space objects do not need to be sent to platform 308. This data includes satellite ephemeris data. Instead, avoidance data 304 containing data, such as strips 324, are sent to platform 308. Strips 324 define keep-out zones in which operation of platform 308 should not occur while strips 324 are valid. Strips 324 are sent in a manner that obscures the positioning and paths of different space objects.

Turning next to FIG. 4, an illustration of a block diagram of platform parameters is depicted in accordance with an illustrative embodiment. In this illustrative example, platform parameters 329 include information about platform 308 in FIG. 3. For example, platform parameters 329 may include at least one of type 400, location information 402, capability 404, field of view 406, and other suitable information.

Type 400 identifies the type of platform for which avoidance data 304 in FIG. 3 is to be sent. For example, type 400 may be mobile, stationary, a tank, a truck, a ship, a submarine, an aircraft, and other suitable types of platforms. Location information 402 includes at least one of a current location, a route or path, and a feature location for the platform. This information may be updated periodically in platform parameters 329 for platform 308, depending on the particular implementation. In some illustrative examples, location information 402 may be stored separately from platform parameters 329.

Capability 404 identifies various parameters for the capability of platform 308. For example, capability 404 may indicate whether platform 308 includes directed energy system 310, imaging system 312 in FIG. 3, or both. Further, capability 404 also may identify specific types of systems. For example, if directed energy system 310 is present in platform 308, capability 404 may indicate that directed energy system 310 is a laser system. Further, capability 404 may indicate information about the laser, such as the class, the maximum power, the minimum power, the wavelength, the divergence, the imaging system type, and other suitable information about the laser.

Field of view 406 identifies a field of view in which platform 308 may operate directed energy system 310, imaging system 312, or both. With this information, avoidance system 301 in FIG. 3 may generate avoidance data 304 specifically tailored for platform 308. By tailoring avoidance data 304 to platform 308, avoidance data 304 may be configured to further obscure information that may be used to locate space object 306.

For example, depending on capability 404 of platform 308, avoidance data 304 may not be needed for space object 306. For example, space object 306 may have sensors that are sensitive to a particular range of wavelengths. If capability 404 indicates that platform 308 has a directed energy system that does not operate in those wavelengths, then generating avoidance data 304 for space object 306 may be unnecessary.

As another example, the payloads or sensors on space object 306 may not be susceptible to laser beams having a power below a selected threshold. If capability 404 for platform 308 indicates that directed energy system 310 has a strength less than the threshold for space object 306, then generating avoidance data 304 also may be unnecessary for space object 306.

In these illustrative examples, platform parameters 329 of platform 308 may be used to identify the minimum characteristics of the strip unique to platform 308. With platform parameters 329, an identification of times during which platform 308 does not operate may be identified.

Turning next to FIG. 5, an illustration of a block diagram of avoidance data is depicted in accordance with an illustrative embodiment. In this depicted example, strip parameters 326 in avoidance data 304 in FIG. 3 may include at least one of dimensions 500, orientations 502, positions 503, periods of time 504, and other suitable parameters.

Dimensions 500 may be, for example, shapes 506 and sizes 508 for strips 324 in FIG. 3. For example, if a shape of the strip is a rectangle, the size may be a length and a width. Of course, if the strip is hemispherical, the length and width do not sit on a plane. Orientations 502 are the angles of strips 324 relative to platform 308, a local reference system, or some other reference point or system.

In these illustrative examples, orientations 502 may take the form of random orientations 510. In other words, the orientation of a particular strip may be selected randomly rather than using any pattern or algorithm. With random orientations 510, an ability to identify path 318 for space object 306 in FIG. 3 may be made even more difficult.

Positions 503 are positions for strips 324. These positions are three-dimensional positions in the depicted examples. The position may be described using any suitable coordinate or reference system.

Periods of time 504 indicate periods of time in which strips 324 are valid. For example, a period of time in periods of time 504 for a strip in strips 324 may be valid while space object 306 is present within the strip. Periods of time 504 may take the form of a list of start times and stop times.

Additionally, strip parameters 326 in FIG. 3 may define strips 324 such that at least a portion of strips 324 overlap each other. This overlap may be an overlap in time. In other words, a period of time in periods of time 504 for one strip may overlap another period of time in periods of time 504 for another strip in strips 324. Additionally, the overlap also may be with respect to orientations or dimensions 500. For example, at least a portion of the strips in strips 324 may overlap each other.

Further, with random orientations 510, a number of strips 324 may be positioned off path 318 of space object 306. A "number of", as used herein with reference to items, means one or more items. For example, a number of strips 324 may be one or more of strips 324. In selecting dimensions 500 for strips 324, strips 324 may have at least one of different shapes and different sizes.

In these illustrative examples, strip parameters 326 in avoidance data 304 also may take into account information about platform 308. For example, field of view 406 in FIG. 4 may be used to generate strip parameters 326 for strips 324. For example, platform parameters 329 of platform 308 may be used to identify the minimum characteristics of the strip unique to platform 308.

Based on platform parameters 329, an identification of times during which platform 308 does not operate may be used to generate number of gaps 520 in strips 324. In other words, an absence of an overlap in number of gaps 520 may be present during some periods of time when platform 308 is not operating. In these illustrative examples, a platform is considered to be not operating when the platform is not planned for operation, is not capable of operating, or a combination of the two. For example, an absence of strips may be present in avoidance data 304 for some periods of time even though path 318 of space object 306 may be over field of view 406 of platform 308.

In another illustrative example, number of gaps 520 may be generated based on a limitation of field of view 406. In these illustrative examples, positions 503, dimensions 500, and orientations 502 may be selected to create number of gaps 520 between at least some of strips 324. Number of gaps 520 may be used to further obscure the path of a space object.

For example, if field of view 406 does not extend around the horizon, the limit in the field of view may be used to generate number of gaps 520 with those gaps being outside of field of view 406 of platform 308.

Thus, number of gaps 520 may be generated based on field of view 406 and other parameters in platform parameters 329. With an ability to include number of gaps 520, path 318 for space object 306 may be further obscured in avoidance data 304.

With reference now to FIG. 6, an illustration of a block diagram of space object database 330 is depicted in accordance with an illustrative embodiment. In this depicted example, space object database 330 includes ephemeris data 600 and sensitivities 602.

In the illustrative examples, ephemeris data 600 is information about positions of objects at a given time, the orbital path of the space object, or a combination of the two. These positions at different times may be used to identify path 318 for space object 306 in FIG. 3.

Sensitivities 602 indicate sensitivities of different payloads or sensors aboard the space objects. For example, sensitivities 602 may indicate a sensitivity of particular components in a space object to different types of directed energy systems. Further, sensitivities 602 also may indicate a sensitivity as to whether a particular object should be imaged by a particular type of imaging system.

The illustration of space object avoidance environment 300 in FIG. 3 and various components of this environment in FIGS. 4-6 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, avoidance data generator 302 may be used to generate avoidance data for other space objects in addition to space object 306. Further, avoidance data 304 may be generated for other platforms in addition to platform 308. In these illustrative examples, avoidance data generator 302 also may be located in a platform, depending on the security provided by the platform.

Turning next to FIG. 7, an illustration of an avoidance system and a client fire control system is depicted in accordance with an illustrative embodiment. As depicted, avoidance system 700 is an example of one implementation for avoidance system 301 in FIG. 3. As depicted, avoidance system 700 is an illustrative example of a satellite predictive avoidance system. In this illustrative example, avoidance may be sent for use in avoiding satellites in a manner such that the path of the space object is obscured. In other words, a path, such as a vector of the space object, cannot be identified from the avoidance data. In the manner, ephemeris data is removed and not sent for use to a platform. The generation and distribution of this avoidance data is performed centrally in this particular example.

Avoidance system 700 provides avoidance data to fire control client system 702. Fire control client system 702 is a fire control client system that may be implemented in one or more platforms 703 for use in controlling directed energy weapons in this particular example. As depicted, avoidance data generator 704 is an example of an implementation for avoidance data generator 302 in FIG. 3.

As depicted, avoidance data generator 704 comprises ephemeris update service 706, strip server service manager 708, strip server service threads 710, strip server delivery threads 712, and weapon registration service 714. In these illustrative examples, ephemeris update service 706 receives ephemeris data from master ephemeris database 716 and stores that data locally in local ephemeris database 718. This data is similar to ephemeris data 600 in FIG. 6 and includes information about the locations and orbital paths of different satellites. In particular, this ephemeris data is satellite ephemeris data that identifies the positions and orbital paths of satellites.

In these illustrative examples, strip server service manager 708 initiates strip server service threads 710. Each strip server service thread corresponds to a particular platform in platforms 703. As depicted, fire control clients 722 in fire control client system 702 are located in platforms 703. Fire control clients 722 control the firing of weapons in platforms 703. Each platform in platforms 703 has a fire control client in fire control clients 722. In these illustrative examples, fire control clients 722 register platforms 703 with avoidance system 700. In particular, fire control clients 722 may communicate with avoidance system 700 or tactical network 724.

Tactical network 724 is a network that is established for platforms 703 to communicate with avoidance system 700. Tactical network 724 may be, for example, without limitation, an ad-hoc network. In these illustrative examples, communication over tactical network 724 may be made using tactical waveform data links, Wi-Fi radio frequency links, satellite communications links, and other types of communications media.

In this illustrative example, fire control clients 722 register with weapon registration service 714 in avoidance system 700. This registration may include supplying information about platforms 703 to weapon registration service 714. This information is stored in weapon registration database 726.

In these illustrative examples, when a platform in platforms 703 registers with weapon registration service 714, the registration of the new platform is indicated to strip server service manager 708 by weapon registration service 714. In response, strip server service manager 708 identifies information about the new platform from weapon registration database 726 for the platform. Additionally, strip server service manager 708 initiates a strip server service thread in strip server service threads 710 for that new platform.

In these illustrative examples, strip server service threads 710 create weapon protection lists 728. Each weapon protection list in weapon protection lists 728 is a list of satellites for which avoidance data is to be generated. The particular satellites on a list for a particular platform may depend on the capabilities of that platform. For example, different types of lasers may affect different satellites differently. A weapon protection list identifies satellites that are of concern for a particular platform. The weapon protection list may include ephemeris data for the satellites in the list.

As a result, one weapon protection list may be different from another weapon protection list in weapon protection lists 728. In other illustrative examples, ephemeris update service 706 may generate weapon protection lists 728 without regard to the type of laser.

In this implementation, all laser systems may require avoidance data. Further, each time updates are made to local ephemeris database 718 from master ephemeris database 716, weapon protection lists 728 may be updated to reflect changes in satellites, orbits of satellites, and other information. For example, satellites may change orbits, new satellites may be added, satellites may be removed, and other changes may be made.

In these illustrative examples, strip server service manager 708 may obtain information from weapon registration database 726 for use in generating parameters for strips. For example, the capability of the weapon, the field of view of the weapon, operating times of the weapon, and other information may be used. These parameters are sent to strip server service threads 710 for use in generating strips for avoidance data.

The strips generated for the avoidance data are sent to weapon strip containers 730. Each weapon strip container in weapon strip containers 730 contains strips for a particular platform. Strip server delivery threads 712 are configured to send avoidance data with the strips to fire control clients 722 for use in operating platforms 703.

With avoidance system 700, avoidance data containing strips may be sent to platforms 703. In particular, avoidance system 700 may be used to manage the operation of many platforms in a manner that avoids undesired illumination of satellites. Further, this system allows for a real-time or near real-time generation of avoidance data based on the current positions of platforms 703. In these illustrative examples, real-time means that avoidance data is generated as soon as possible when positions of platforms are identified. Intentional delays in the generation of avoidance data does not occur with real-time generation of avoidance data in these depicted examples.

As can be seen, the avoidance data is generated using ephemeris data. Avoidance system 700 avoids sending ephemeris data about satellites to platforms 703.

The illustration of avoidance system 700 in FIG. 7 is not meant to imply limitations to the manner in which an avoidance system may be implemented. Avoidance system 700 is only meant to be an example of one manner in which avoidance system 301 in FIG. 3 may be implemented.

For example, in other illustrative embodiments, avoidance system 700 may be configured to provide avoidance data to imaging systems, such as observatories. In still other illustrative examples, avoidance system 700 may be configured to provide avoidance data for avoiding illumination of other types of space objects other than satellites.

For example, avoidance system 700 may be configured to provide avoidance data for space stations and other suitable objects that may be in space. In still yet other illustrative examples, avoidance system 700 may be configured to provide avoidance data for aircraft in addition to or in place of spacecraft. In still other illustrative examples, the processes illustrated for avoidance system 700 may be performed in more than one location in providing the avoidance data to the platforms. The generation of the avoidance data from the ephemeris data is performed such that the ephemeris data does not reach the platforms in these illustrative examples.

Figure 8:
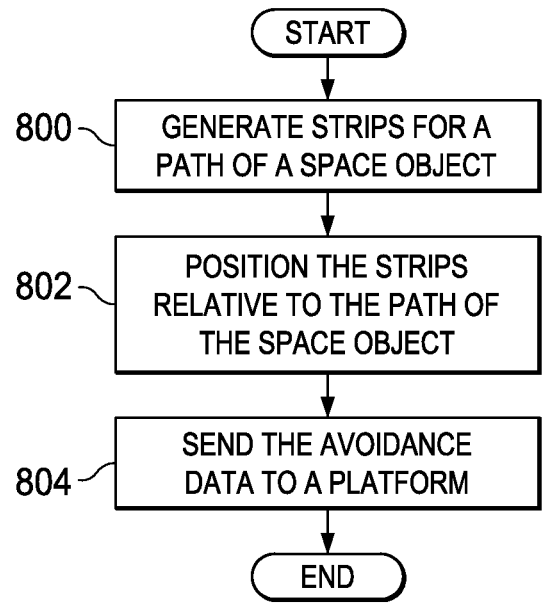
FIG. 8 is an illustration of a flowchart of a process for generating avoidance data in accordance with an illustrative embodiment.

Turning next to FIG. 8, an illustration of a flowchart of a process for generating avoidance data is depicted in accordance with an illustrative embodiment. This process may be implemented in avoidance data generator 302 in FIG. 3. Further, this process may be implemented in avoidance data generator 704 in avoidance system 700 in FIG. 7.

The process begins by generating strips for a path of a space object (operation 800). The process then positions the strips relative to the path of the space object (operation 802). In these illustrative examples, the strips have parameters that obscure an identification of the path of the space object to form the avoidance data. The process then sends the avoidance data to a platform (operation 804), with the process terminating thereafter.

Figure 9:
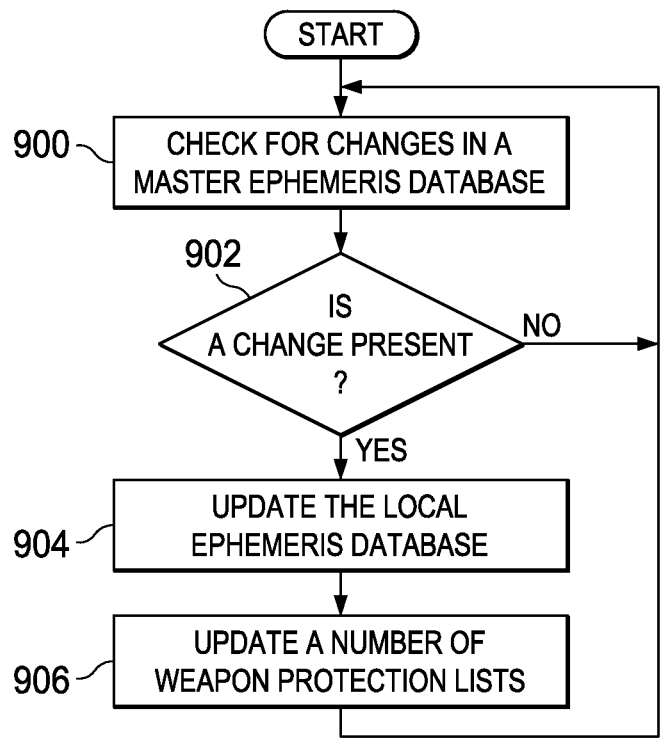
FIG. 9 is an illustration of a flowchart of a process for updating weapon protection lists in accordance with an illustrative embodiment.

Turning next to FIG. 9, an illustration of a flowchart of a process for updating weapon protection lists is depicted in accordance with an illustrative embodiment. The process illustrated in FIG. 9 may be implemented in ephemeris update service 706 in FIG. 7 in these illustrative examples. This process may update an identification of space objects for which avoidance data should be generated.

The process begins by checking for changes in the master ephemeris database (operation 900). In this example, the master ephemeris database may be master ephemeris database 716 in FIG. 7. A determination is made as to whether a change is present (operation 902). If a change is present, the process then updates the local ephemeris database (operation 904), and updates a number of weapon protection lists (operation 906), with the process then returning to operation 900. These weapon protection lists may be, for example, weapon protection lists 728 in FIG. 7. In particular, the number of weapon protection lists is weapon protection lists assigned to weapons that are affected by the changes. With reference again to operation 902, if a change in the local ephemeris database is not present, the process also returns to operation 900.

Figure 10:
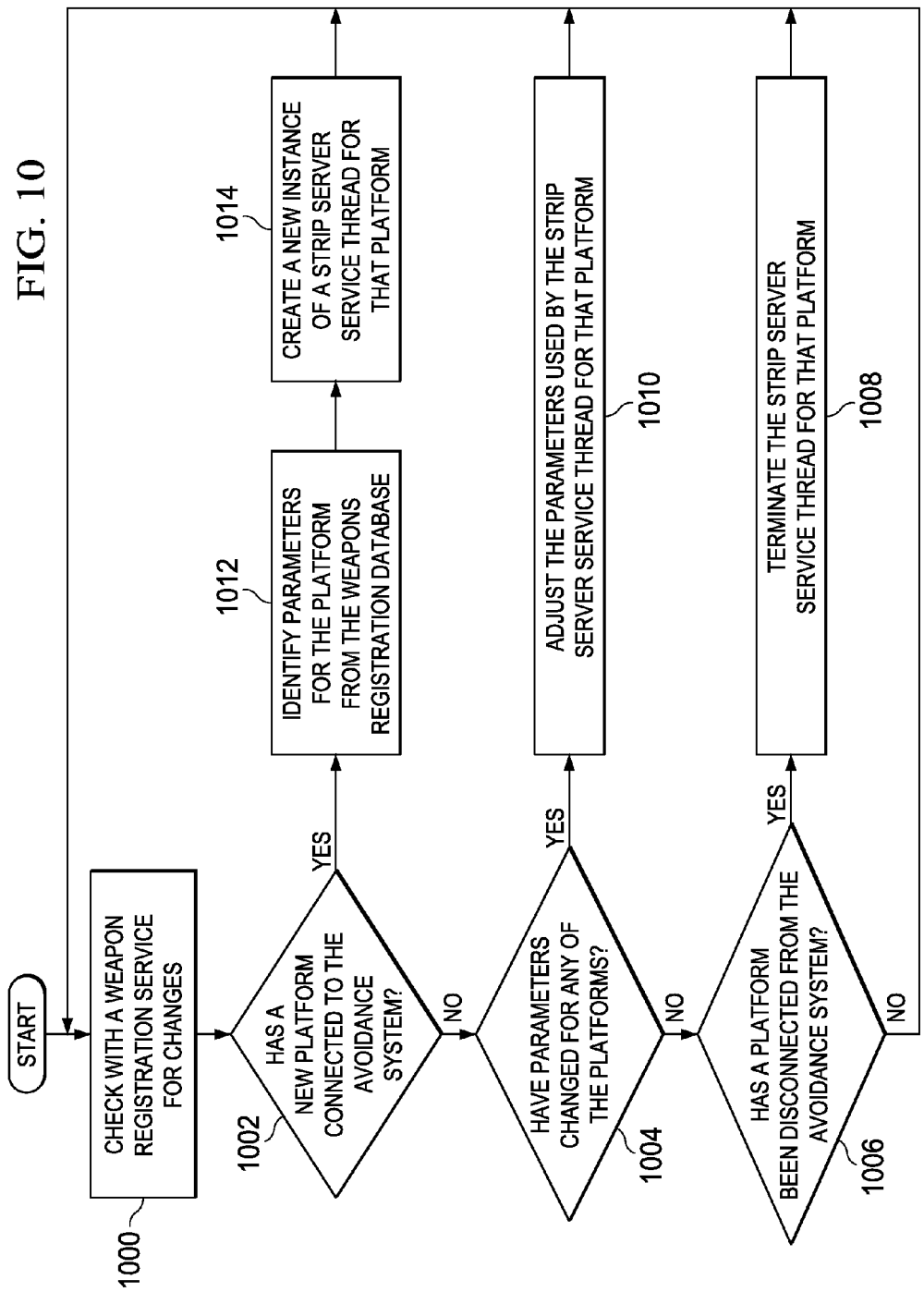
FIG. 10 is an illustration of a flowchart of a process for managing the generation of avoidance data for platforms in accordance with an illustrative embodiment.

Turning next to FIG. 10, an illustration of a flowchart of a process for managing the generation of avoidance data for platforms is depicted in accordance with an illustrative embodiment. The process illustrated in FIG. 10 may be implemented in strip server service manager 708 in FIG. 7.

The process begins by checking with a weapon registration service for changes (operation 1000). These changes may be, for example, a connection of a platform, a change in the parameters for a platform, or a disconnection of a platform.

A determination is made as to whether a new platform has connected to the avoidance system (operation 1002). In these illustrative examples, a connection of a platform to an avoidance system results in a registration of the platform.

If a new platform has not connected to the avoidance system, a determination is made as to whether parameters have changed for any of the platforms (operation 1004). These parameters are information about the platform and may include, for example, without limitation, operating times, field of view, location information, and other parameters for the platforms. If none of the parameters for the platform have changed, a determination is made as to whether a platform has been disconnected from the avoidance system (operation 1006). If a platform has not been disconnected, the process returns to operation 1000. Otherwise, if a platform has been disconnected, the process terminates the strip server service thread for that platform (operation 1008). The process then returns to operation 1000.

With reference again to operation 1004, if parameters have changed for any of the platforms, the process then adjusts the parameters used by the strip server service thread for that platform (operation 1010). The process then returns to operation 1000 as described above.

With reference again to operation 1002, if a new platform has been connected, the process then identifies parameters for the platform from the weapons registration database (operation 1012). This weapons registration database may be, for example, weapon registration database 726 in FIG. 7. Thereafter, the process creates a new instance of a strip server service thread for that platform (operation 1014), with the process then returning to operation 1000 as described above.

Figure 11:
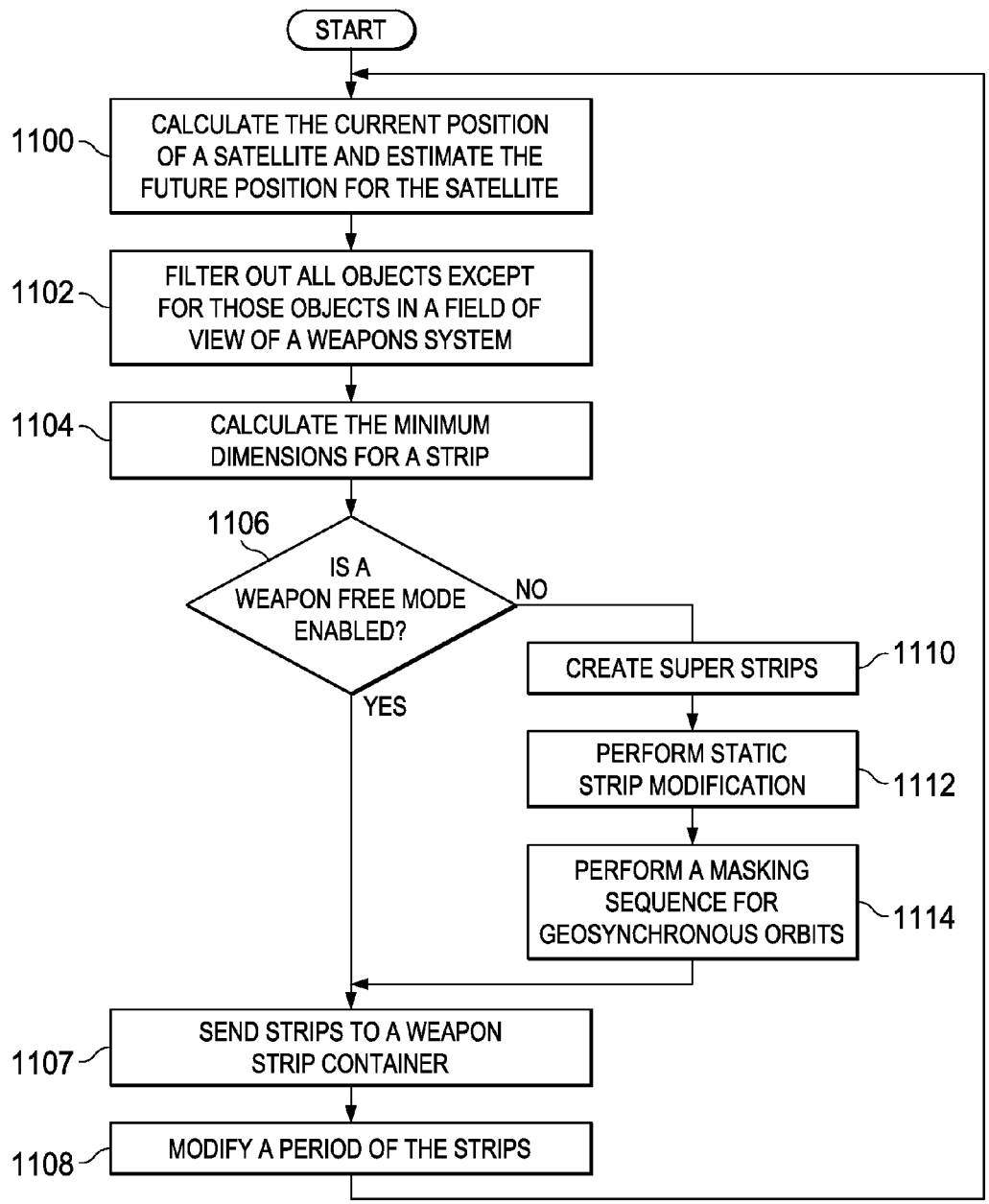
FIG. 11 is an illustration of a flowchart of a process for generating avoidance data in a strip server service thread in accordance with an illustrative embodiment.

With reference now to FIG. 11, an illustration of a flowchart of a process for generating avoidance data in a strip server service thread is depicted in accordance with an illustrative embodiment. This process may be implemented in a strip server service thread in strip server service threads 710 in FIG. 7.

The process begins by calculating the current position of a satellite and estimating the future position for the satellite (operation 1100). Thereafter, the process filters out all objects except for those objects in a field of view of a weapons system (operation 1102). This type of filtering may be referred to as hemispherical filtering. The process then calculates the minimum dimensions for a strip (operation 1104). These minimum dimensions may be the smallest strip that can be generated that covers the path of the satellite and provides protection from illumination.

Thereafter, a determination is made as to whether a weapon free mode is enabled (operation 1106). In these illustrative examples, a weapon free mode is a mode in which firing or illumination of directed energy opportunities are maximized or increased. A weapons free mode for a platform is a mode in which a weapon may automatically operate without operator interaction. This increase in firing opportunities occurs at the expense of security as the amount of information hiding is minimized to ensure maximum sky coverage. Removing the amount of hidden information results in fewer and smaller strips, which increases the chances of detection of an orbital path.

If a weapon free mode is enabled, the process sends strips to a weapon strip container (operation 1107). Thereafter, the process modifies a period of the strips (operation 1108), with the process then returning to operation 1100. In operation 1108, the process dynamically adjusts the time between sets of strips and may include overlap or jitter in the period in which the strip is sent to increase security. In the illustrative examples, jitter is a random change. More specifically, with jitter, the random change occurs over time in the illustrative examples.

In these illustrative examples, when the period of time is jittered, the period of time changes. In other words, strips may be sent at different periods of time rather than a set period of time. Jittering the time period in which the strips are sent reduces the chance that periodic analysis can be used to detect future positions of the object if the data is compromised. A set of strips or all of the strips are sent in avoidance data at a particular time to a platform in these illustrative examples.

With reference again to operation 1106, if the weapon free mode is not enabled indicating that the real-time need for operation is lowered; the process performs additional information hiding mechanisms. This process starts by creating super strips (operation 1110). A super strip is a strip that includes more than one path of a satellite. In other words, a super strip may include two or more paths for satellites or other space objects. A super strip may add to the uncertainty of the actual path of a space object through the super strip.

The process then performs static strip modification (operation 1112). This process provides masking for static objects. In these illustrative examples, a static object is, for example, a satellite or other space object that is in a geosynchronous orbit or some other orbit in which the position of the space object appears to be substantially the same in the sky or appears to be substantially over the same location on the Earth.

The process then performs a masking sequence for geosynchronous orbits (operation 1114). This step is an optional step which may create a strip that may mask all objects that are substantially stationary with respect to a position over the Earth. In other words, this strip may cover all objects in a geosynchronous orbit. The process then proceeds to operation 1107 as described above.

Figure 12:
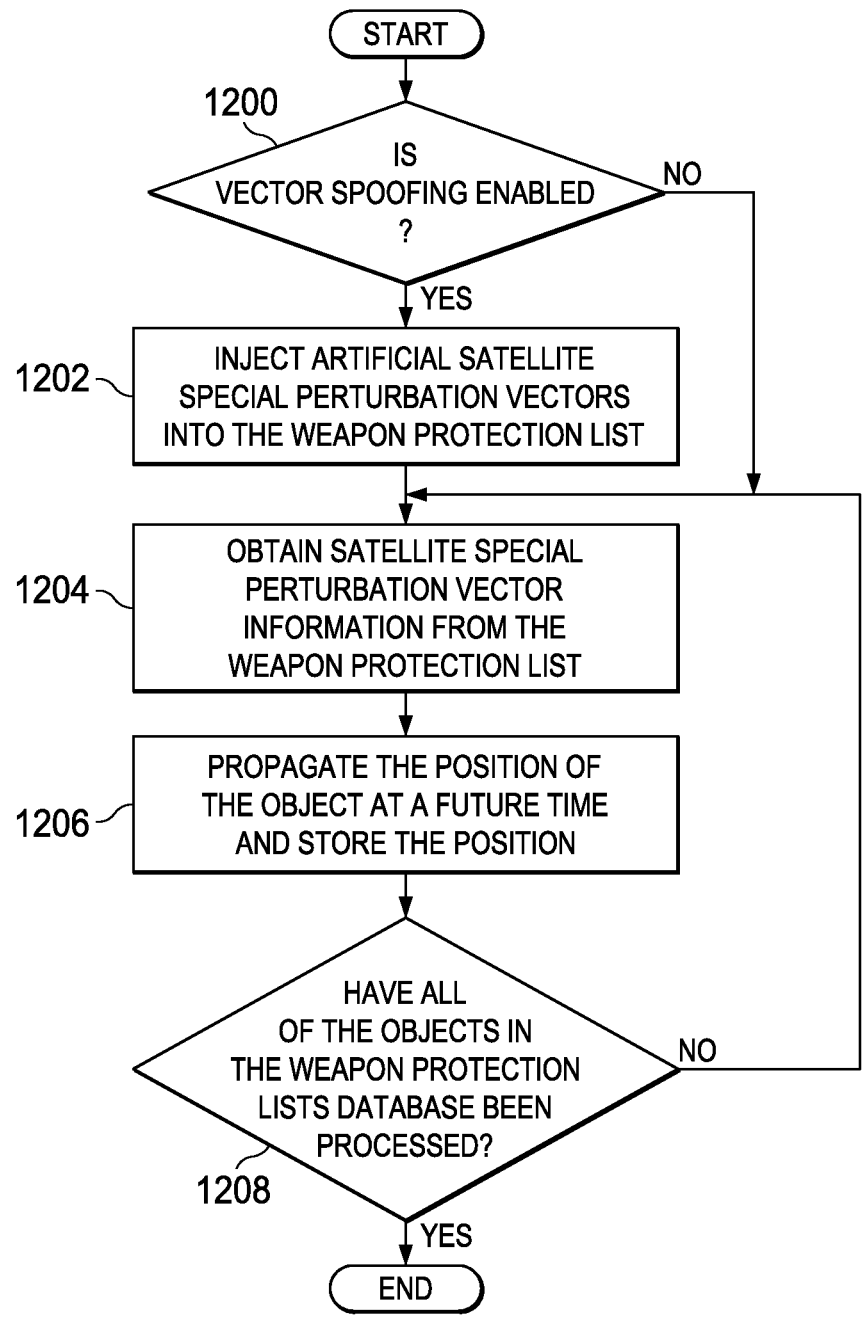
FIG. 12 is an illustration of a flowchart of a process for propagating satellite positions in accordance with an illustrative embodiment.

Turning next to FIG. 12, an illustration of a flowchart of a process for propagating satellite positions is depicted in accordance with an illustrative embodiment. The process illustrated in FIG. 12 is an example of one implementation for operation 1100 in FIG. 11.

The process begins by determining whether vector spoofing is enabled (operation 1200). Vector spoofing is the process of injecting "fake" or "non-real" space objects into the input stream to be processed. These space objects contain valid ephemeris data, but the objects do not really exist in the real world. These non-real objects are designed to add confusion between real and imaginary space objects. The use of imaginary space objects provides an additional protection about the paths of space objects if data stored at a platform is compromised.

If vector spoofing is enabled, the process injects artificial satellite special perturbation vectors into the weapon protection list (operation 1202). These artificial satellite objects are randomly generated and used to increase the difficulty in distinguishing which objects are real or not and to increase the complexity required to detect individual space object paths in case the data on a platform is compromised. In these illustrative examples, special perturbation vectors include vector covariance matrices (VCM), multiple state vectors, and orbit specifics including drag and covariance matrices.

The process then obtains satellite special perturbation vector information from the weapon protection list (operation 1204). In these illustrative examples, the satellite special perturbation vector information includes state vector and associated covariance matrices representing the orbital position of the satellite and atmospheric drag information. The satellite uncertainty value is a margin of safety around the propagated position of the satellite position. With propagated special perturbation vectors, this value is calculated by algorithms. An additional margin may also be applied, as in the case of the uncertainty value here.

The process then propagates the position of the object at a future time and stores the position (operation 1206). Thereafter, a determination is made as to whether all of the objects in the weapon protection lists database have been processed (operation 1208). If all of the objects in the weapon protection lists database have not been processed, the process returns to operation 1204. Otherwise, the process terminates. With reference again to operation 1200, if vector spoofing has not been enabled, the process proceeds to operation 1204 as described above.

Figure 13:
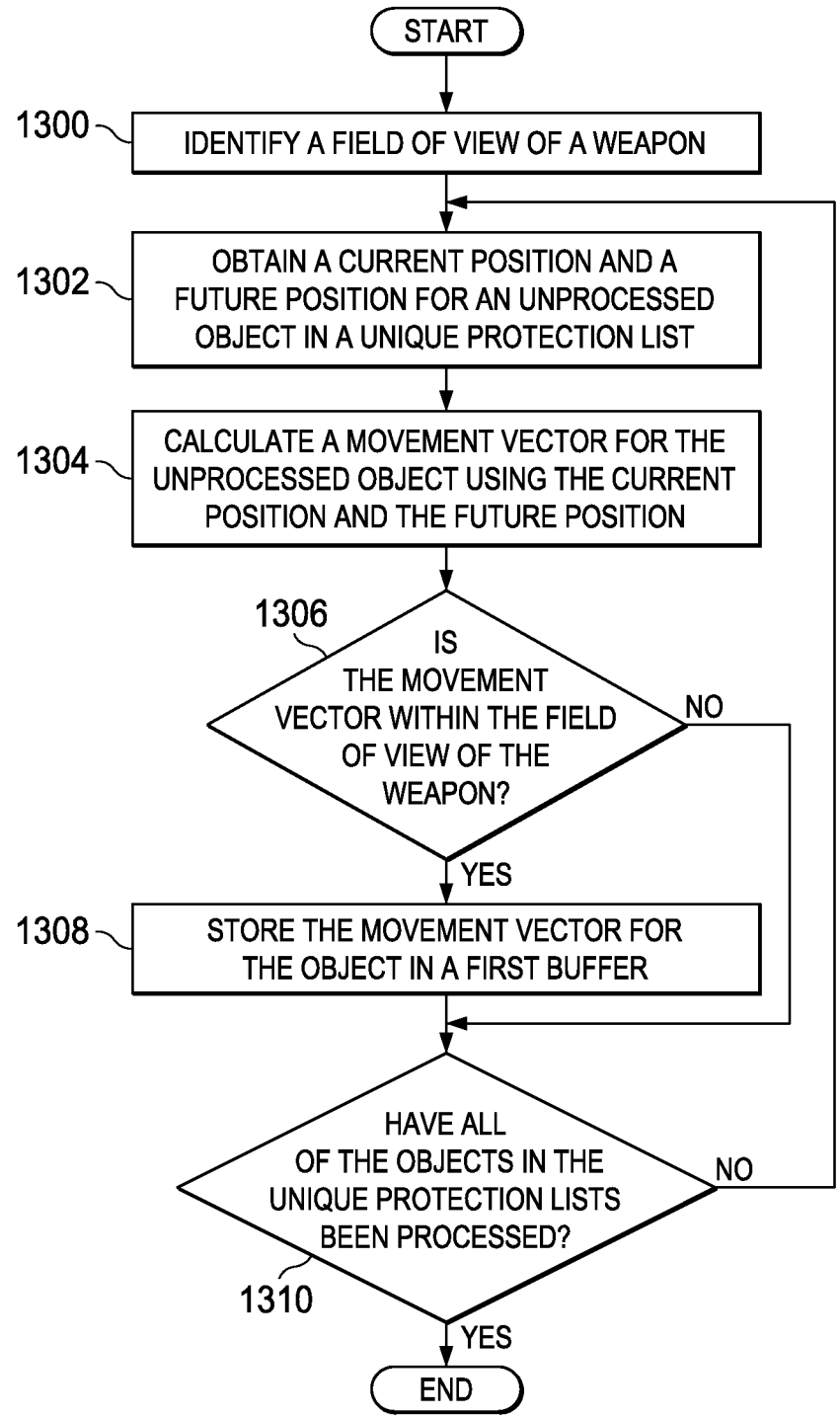
FIG. 13 is an illustration of a flowchart of a process for filtering out objects in accordance with an illustrative embodiment.

Turning next to FIG. 13, an illustration of a flowchart of a process for filtering out objects is depicted in accordance with an illustrative embodiment. This process is an example of one implementation for operation 1102 in FIG. 11.

The process begins by identifying a field of view of a weapon (operation 1300). This field of view may be a hemisphere of monitoring for the weapon. A hemisphere of monitoring is a line of sight accessible in a hemispherical area above the weapon.

The process then obtains a current position and a future position for an unprocessed object in a unique protection list (operation 1302). Thereafter, a movement vector is calculated for the unprocessed object using the current position and the future position (operation 1304).

A determination is made as to whether the movement vector is within the field of view of the weapon (operation 1306). If the movement vector is within the field of view of the weapon, the movement vector for the object is stored in a first buffer (operation 1308). Thereafter, a determination is made as to whether all of the objects in the unique protection lists have been processed (operation 1310). If all of the objects have been processed, the process terminates. Otherwise, the process returns to operation 1302. With reference again to operation 1306, if the movement vector is not within the field of view of the weapon, the process proceeds to operation 1310 as described above.

Figure 14:
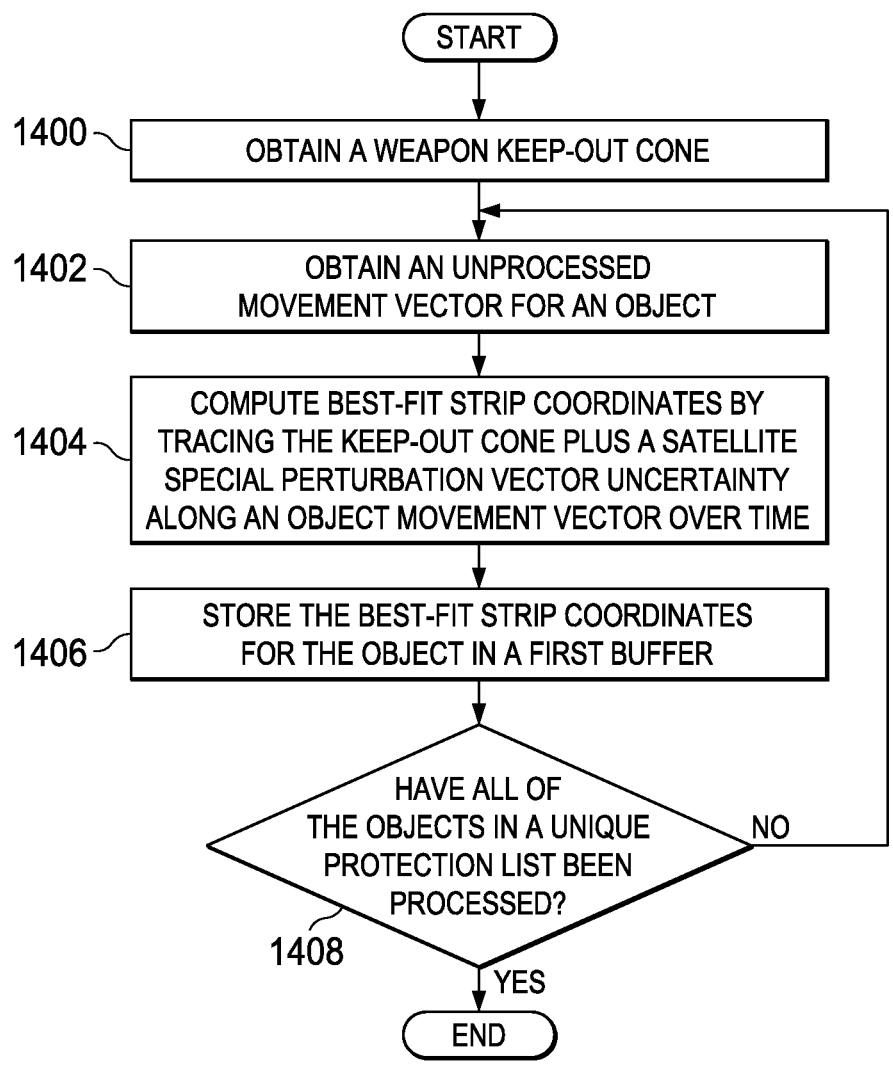
FIG. 14 is an illustration of a flowchart of a process for identifying minimum strip dimensions in accordance with an illustrative embodiment.

Turning next to FIG. 14, an illustration of a flowchart of a process for identifying minimum strip dimensions is depicted in accordance with an illustrative embodiment. The process illustrated in FIG. 14 is an example of one implementation of operation 1104 in FIG. 11.

The process begins by obtaining a weapon keep-out cone (operation 1400). The weapon keep-out cone is the region around the beam of energy which represents the uncertainty of the accuracy of the capability of the platform to point and control the beam of energy. Thereafter, an unprocessed movement vector for an object is obtained (operation 1402). Best-fit strip coordinates are computed by tracing the keep-out cone plus a satellite special perturbation vector uncertainty along an object movement vector over time (operation 1404). Operation 1404 combines the keep-out cone and uncertainty angles to form an uncertainty angular circle about the line-of-sight of the laser weapon. The uncertainty angular circle is then stepped along the propagated position calculated in operation 1404 to form the minimum size of the strip. In other words, a smallest strip possible is created around a plane that intersects the keep-out cone. This strip may take the form of a box that intersects the keep-out cone on the plane.

The process then stores the best-fit strip coordinates for the object in a first buffer (operation 1406). Thereafter, a determination is made as to whether all of the objects in a unique protection list have been processed (operation 1408). If all of the objects have been processed, the process terminates. Otherwise, the process returns to operation 1402 as described above.

Figure 15:
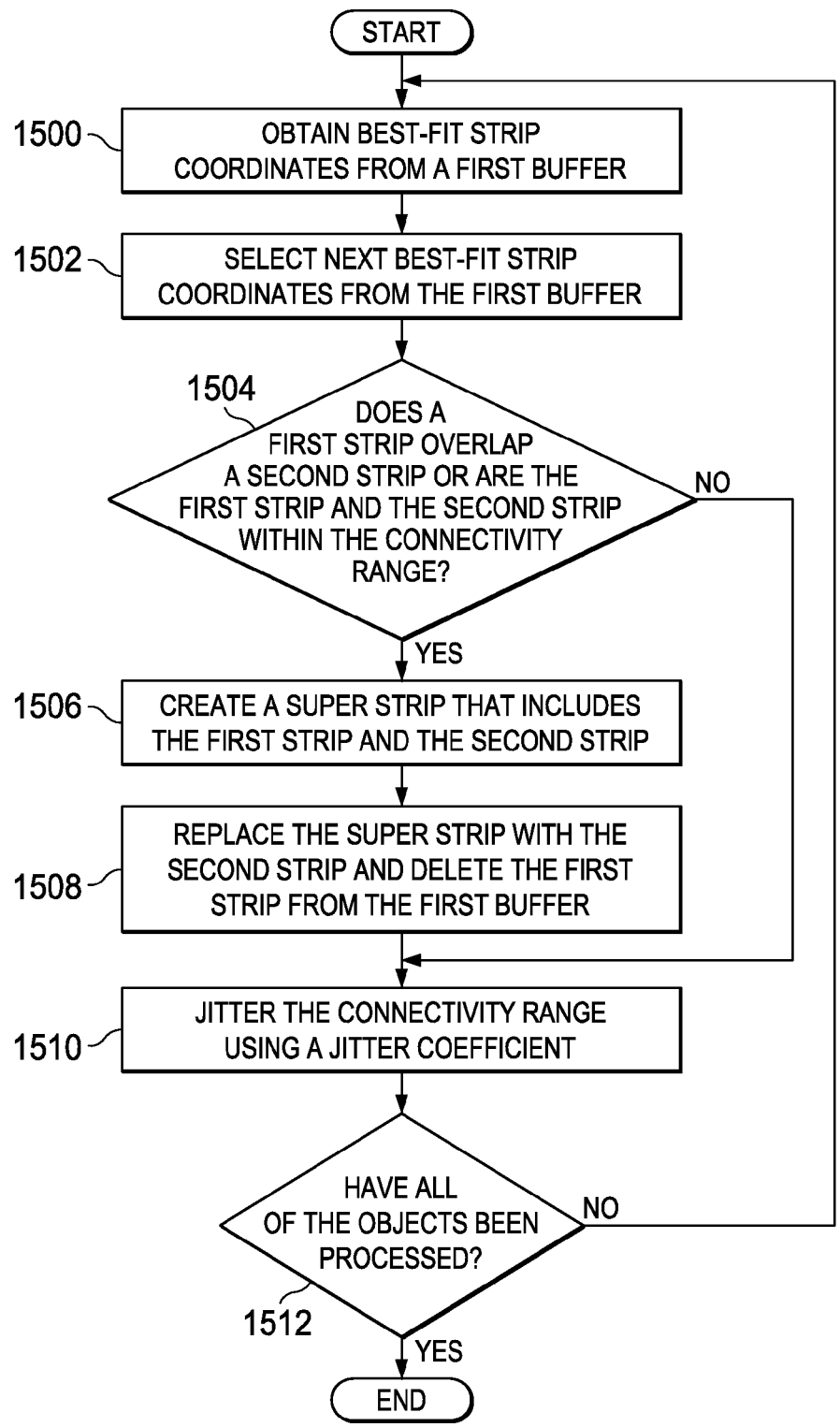
FIG. 15 is an illustration of a flowchart of a process for creating super strips in accordance with an illustrative embodiment.

Turning next to FIG. 15, an illustration of a flowchart of a process for creating super strips is depicted in accordance with an illustrative embodiment. The process illustrated in FIG. 15 is an example of one manner in which operation 1110 in FIG. 11 may be implemented.

The process begins by obtaining best-fit strip coordinates from a first buffer (operation 1500). Thereafter, the process selects next best-fit strip coordinates from the first buffer (operation 1502).

A determination is made as to whether a first strip overlaps a second strip or if the first strip and the second strip are within the connectivity range (operation 1504). The connectivity range is a variable which determines the maximum proximity in angle space of one strip to another strip. The angular space is angular distance in the illustrative examples. As depicted, this connectivity range is used to determine whether to create a super strip to cover both. If the strips overlap or are within the connectivity range, a super strip is created that includes the first strip and the second strip (operation 1506).

Thereafter, the super strip replaces the second strip and the first strip is deleted from the first buffer (operation 1508). The process then "jitters" the connectivity range using a jitter coefficient (operation 1510). In these illustrative examples, "jitter" means that the connectivity range is randomly changed. For example, the connectivity range may be about 1.0 milliradian, about 0.5 milliradian, about 0.25 milliradian, or some other angular distance. The angular distance may change periodically or randomly to jitter the connectivity range. In other words, the proximity of the connectivity range may change randomly or under some pre-determined pattern.

Thereafter, a determination is made as to whether all of the objects have been processed (operation 1512). If all of the objects have been processed, the process terminates. Otherwise, the process returns to operation 1500 as described above. With reference again to operation 1504, if an overlap is not present or the strips are not within the connectivity range, the process proceeds to operation 1510 as described above.

Figure 16:
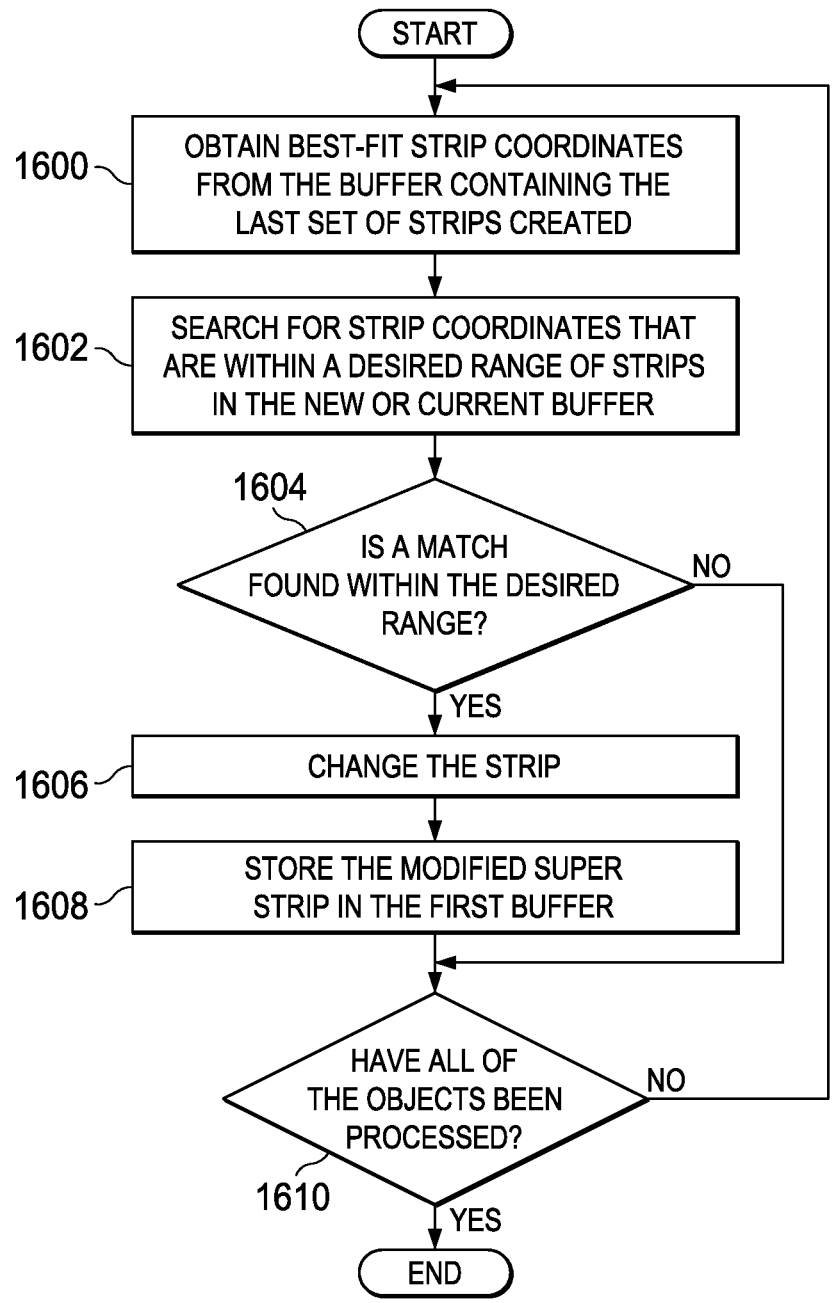
FIG. 16 is an illustration of a flowchart of a process for performing static strip modification in accordance with an illustrative embodiment.

Turning next to FIG. 16, an illustration of a flowchart of a process for performing static strip modification is depicted in accordance with an illustrative embodiment. The process illustrated in FIG. 16 is an example of one manner in which operation 1112 in FIG. 11 may be implemented.

The process begins by obtaining best-fit strip coordinates from the buffer containing the last set of strips created (operation 1600). The process then searches for strip coordinates that are within a desired range of strips in the new or current buffer (operation 1602). In operation 1602, the search looks for strips that were previously sent and analyzes those strips to see if the physical properties of the strips did not change. If the physical properties of those strips did not change, it is desirable to change those strips before sending them out another time.

A determination is made as to whether a match is found within the desired range (operation 1604). If a match is found, the process then changes the strip (operation 1606). In operation 1606, the strip may be changed in size or twisted in three dimensions. The strip in operation 1606 may be a strip or a super strip. The change in the strip is performed to increase security and reduce a possibility that a strip may be used to identify the path of a satellite. The process then stores the modified super strip in the first buffer (operation 1608).

A determination is then made as to whether all of the objects have been processed (operation 1610). If all of the objects have not been processed, the process returns to operation 1600. Otherwise, the process terminates. With reference again to operation 1604, if a match is not found, the process proceeds to operation 1610 as described above.

Figure 17:
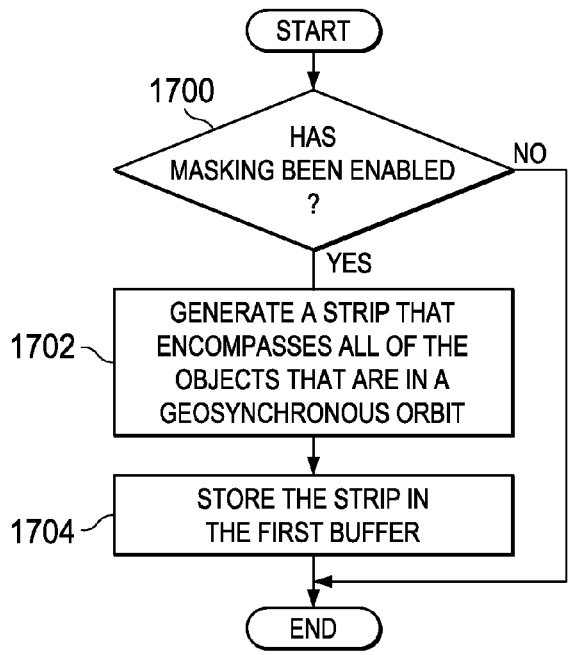
FIG. 17 is an illustration of a flowchart of a process for masking geosynchronous orbits in accordance with an illustrative embodiment.

Turning next to FIG. 17, an illustration of a flowchart of a process for masking geosynchronous orbits is depicted in accordance with an illustrative embodiment. The process illustrated in FIG. 17 is an example of one manner in which operation 1114 in FIG. 11 may be performed.

The process begins by determining whether masking has been enabled (operation 1700). If masking has not been enabled, the process terminates. Otherwise, the process generates a strip that encompasses all of the objects that are in a geosynchronous orbit (operation 1702). The process then stores the strip in the first buffer (operation 1704), with the process terminating thereafter.

Figure 18:
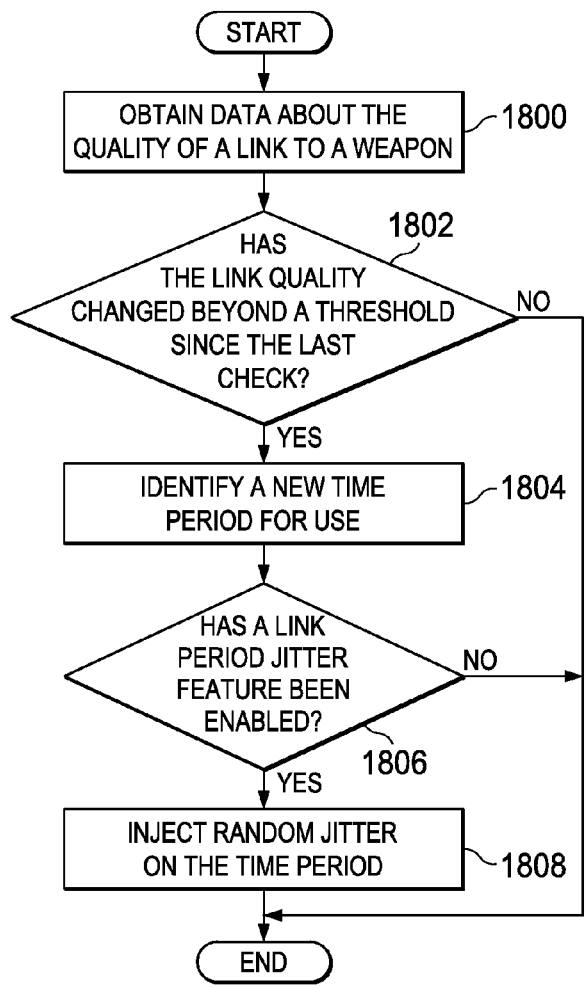
FIG. 18 is an illustration of a flowchart of a process for modifying times between strips in accordance with an illustrative embodiment.

Turning next to FIG. 18, an illustration of a flowchart of a process for modifying times between strips is depicted in accordance with an illustrative embodiment. This process is an example of one implementation for operation 1108 in FIG. 11.

The process begins by obtaining data about the quality of a link to a weapon (operation 1800). Thereafter, a determination is made as to whether the link quality has changed beyond a threshold since the last check (operation 1802). If the link quality has changed beyond the threshold, a new time period is identified for use (operation 1804). This new period of time is the period of time between which strips are sent to a platform. In other words, strips are sent each time the period of time has elapsed.

If the period of time is shorter, strips may be sent more frequently. A shorter period of time may be used when a connection or communications link to a platform is considered to be reliable or fast enough for the shorter period of time. If the connection is less reliable or a longer period of time is desired, then the current period of time may be made longer. For example, the period of time may be from about 30 seconds to about two minutes in some illustrative examples.

Thereafter, a determination is made as to whether a link period jitter feature has been enabled (operation 1806). This feature is used to change the period of time used for sending strips to a platform. In this illustrative example, the link period jitter feature provides a random change or other type of variability in the period of time.

If the link period jitter has been enabled, the process injects random jitter on the time period (operation 1808), with the process terminating thereafter. In other words, the time period is randomly changed in operation 1808. Otherwise, the process terminates without injecting random jitter. With reference again to operation 1802, if the link quality has not changed beyond a threshold since the last check, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 19, an illustration of a data processing system is depicted in accordance with an illustrative embodiment. Data processing system 1900 may be used to implement computer system 314 in FIG. 3, computer systems in platforms on which fire control clients are located, and other data processing systems that may be used in these illustrative embodiments. In this illustrative example, data processing system 1900 includes communications framework 1902, which provides communications between processor unit 1904, memory 1906, persistent storage 1908, communications unit 1910, input/output (I/O) unit 1912, and display 1914. In these examples, communications framework 1902 may be a bus system.

Processor unit 1904 serves to execute instructions for software that may be loaded into memory 1906. Processor unit 1904 may be a number of processors, a multi-processor core, or some other type of processor, depending on the particular implementation. A number, as used herein with reference to an item, means one or more items. Further, processor unit 1904 may be implemented using a number of heterogeneous processor systems in which a main processor is present with secondary processors on a single chip. As another illustrative example, processor unit 1904 may be a symmetric multi-processor system containing multiple processors of the same type.

Memory 1906 and persistent storage 1908 are examples of storage devices 1916. A storage device is any piece of hardware that is capable of storing information, such as, for example, without limitation, data, program code in functional form, and/or other suitable information either on a temporary basis and/or a permanent basis. Storage devices 1916 may also be referred to as computer readable storage devices in these examples. Memory 1906, in these examples, may be, for example, a random access memory or any other suitable volatile or non-volatile storage device. Persistent storage 1908 may take various forms, depending on the particular implementation.

For example, persistent storage 1908 may contain one or more components or devices. For example, persistent storage 1908 may be a hard drive, a flash memory, a rewritable optical disk, a rewritable magnetic tape, or some combination of the above. The media used by persistent storage 1908 also may be removable. For example, a removable hard drive may be used for persistent storage 1908.

Communications unit 1910, in these examples, provides for communications with other data processing systems or devices. In these examples, communications unit 1910 is a network interface card. Communications unit 1910 may provide communications through the use of either or both physical and wireless communications links.

Input/output unit 1912 allows for input and output of data with other devices that may be connected to data processing system 1900. For example, input/output unit 1912 may provide a connection for user input through a keyboard, a mouse, and/or some other suitable input device. Further, input/output unit 1912 may send output to a printer. Display 1914 provides a mechanism to display information to a user.

Instructions for the operating system, applications, and/or programs may be located in storage devices 1916, which are in communication with processor unit 1904 through communications framework 1902. In these illustrative examples, the instructions are in a functional form on persistent storage 1908. These instructions may be loaded into memory 1906 for execution by processor unit 1904. The processes of the different embodiments may be performed by processor unit 1904 using computer-implemented instructions, which may be located in a memory, such as memory 1906.

These instructions are referred to as program code, computer usable program code, or computer readable program code that may be read and executed by a processor in processor unit 1904. The program code in the different embodiments may be embodied on different physical or computer readable storage media, such as memory 1906 or persistent storage 1908.

Program code 1918 is located in a functional form on computer readable media 1920 that is selectively removable and may be loaded onto or transferred to data processing system 1900 for execution by processor unit 1904. Program code 1918 and computer readable media 1920 form computer program product 1922 in these examples. In one example, computer readable media 1920 may be computer readable storage media 1924 or computer readable signal media 1926.

Computer readable storage media 1924 may include, for example, an optical or magnetic disk that is inserted or placed into a drive or other device that is part of persistent storage 1908 for transfer onto a storage device, such as a hard drive, that is part of persistent storage 1908. Computer readable storage media 1924 also may take the form of a persistent storage, such as a hard drive, a thumb drive, or a flash memory, that is connected to data processing system 1900.

In some instances, computer readable storage media 1924 may not be removable from data processing system 1900. In these examples, computer readable storage media 1924 is a physical or tangible storage device used to store program code 1918 rather than a medium that propagates or transmits program code 1918. Computer readable storage media 1924 is also referred to as a computer readable tangible storage device or a computer readable physical storage device. In other words, computer readable storage media 1924 is a media that can be touched by a person.

Alternatively, program code 1918 may be transferred to data processing system 1900 using computer readable signal media 1926. Computer readable signal media 1926 may be, for example, a propagated data signal containing program code 1918. For example, computer readable signal media 1926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1918 may be downloaded over a network to persistent storage 1908 from another device or data processing system through computer readable signal media 1926 for use within data processing system 1900. For instance, program code stored in a computer readable storage medium in a server data processing system may be downloaded over a network from the server to data processing system 1900. The data processing system providing program code 1918 may be a server computer, a client computer, or some other device capable of storing and transmitting program code 1918.

The different components illustrated for data processing system 1900 are not meant to provide architectural limitations to the manner in which different embodiments may be implemented. The different illustrative embodiments may be implemented in a data processing system including components in addition to or in place of those illustrated for data processing system 1900. Other components shown in FIG. 19 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1904 may take the form of a hardware unit that has circuits that are manufactured or configured for a particular use. This type of hardware may perform operations without needing program code to be loaded into a memory from a storage device to be configured to perform the operations.

For example, when processor unit 1904 takes the form of a hardware unit, processor unit 1904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1918 may be omitted, because the processes for the different embodiments are implemented in a hardware unit.

In still another illustrative example, processor unit 1904 may be implemented using a combination of processors found in computers and hardware units. Processor unit 1904 may have a number of hardware units and a number of processors that are configured to run program code 1918. With this depicted example, some of the processes may be implemented in the number of hardware units, while other processes may be implemented in the number of processors.

In another example, a bus system may be used to implement communications framework 1902 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1906 or a cache, such as found in an interface and memory controller hub that may be present in communications framework 1902.

Thus, one or more illustrative embodiments provide a method and apparatus for generating avoidance data. Further, the illustrative embodiments provide a method and apparatus for operating platforms in a manner that allows them to avoid interaction with space objects. In particular, platforms with weapons may avoid directing energy toward those space objects. This avoidance occurs using avoidance data stored at the platform. The avoidance data generated is generated in a manner such that the path of the space object is obscured. In other words, a path, such as a vector of the space object, cannot be identified from the avoidance data. One or more different illustrative embodiments provide an ability to send avoidance data in a manner that reduces concerns about an ability to identify the location or movement of space objects from the data.

The illustrative embodiments provide an ability for platforms to operate upon short notice as compared to currently used systems in which advance notice is needed. With currently used systems, the advance notice may be weeks ahead of a time when a platform is to be operated. In this manner, weapon platforms may be operated as quickly as desired without concern for anyone accessing the platform and identifying paths for space objects. Further, the illustrative embodiments also may be applied to imaging systems. With one or more illustrative embodiments, operators of imaging systems, such as observatories, may generate images with less concern of generating images of space objects that may be deemed classified.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for generating avoidance data, the method comprising:
   receiving, in an avoidance data generator, information about: an object, and a capability of a platform, the object being in space, the avoidance data generator identifying minimum strip dimensions via receiving an unprocessed movement vector for the object and computing a satellite perturbation vector uncertainty along an object movement vector over time, forming a propagated position;
   generating, using the avoidance data generator, strips for a path of the object;
   positioning the strips relative to the path of the object, such that the strips comprise parameters, based on the information about the object and the capability of the platform, that: obscure an identification of the path of the object, make a location of the object unidentifiable, and form the avoidance data;
   sending the avoidance data at jittered time intervals to the platform; and
   determining, using the avoidance data generator, if a first strip and a second strip are within a connectivity range of each other;
   changing an angular distance of the connectivity range;
   comparing a physical property of the first strip and a physical property of the second strip to a physical property of strips previously transmitted by the avoidance data generator to the platform;
   changing the first strip due to the physical property of the first strip being within a range of the physical property of strips previously transmitted by the avoidance data generator to the platform;
   changing the second strip due to the physical property of the second strip being within the range of the physical property of strips previously transmitted by the avoidance data generator to the platform; and
   sending a changed strip to the platform.

2. The method of claim 1, wherein the parameters comprise at least one of dimensions and orientations; and
   receiving in the avoidance data generator, a vector for the object.

3. The method of claim 1 further comprising:
   the platform being a directed energy system.

4. The method of claim 1 further comprising:
   the platform being an imaging system.

5. The method of claim 1, wherein each strip is valid for a period of time respectively, such that some overlap exists between the period of time for each respective strip that shares an overlapping region.

6. The method of claim 5, further comprising the period of time for each respective strip being valid while the object is within the respective strip.

7. The method of claim 1, wherein the strips are positioned such that at least a portion of the path of the object is covered by the strips in which at least a portion of the strips overlap each other.

8. The method of claim 7, wherein the portion of the strips overlaps the each other in time.

9. The method of claim 7, wherein the portion of the strips overlaps the each other in orientation.

10. The method of claim 1, wherein positioning the strips relative to the path of the object comprises:
    positioning a number of strips off the path of the object.

11. The method of claim 1, wherein the strips have different dimensions.

12. The method of claim 1 further comprising:
    identifying a location of the platform; and
    identifying a number of periods of time when the platform is operable; and wherein positioning the strips to the path of the object comprises:
       positioning the strips relative to the path of the object such that a number of gaps is present in the strips on a portion of the path of the object during a period of time in the number of periods of time that the platform is not operating.

13. The method of claim 1 further comprising:
    identifying a location of the platform;
    identifying a field of view of the platform; and wherein positioning the strips relative to the path of the object comprises:
       positioning the strips relative to the path of the object such that a number of gaps is present in the strips on a portion of the path of the object that is outside of the field of view of the platform when the platform is operable.

14. An object avoidance system comprising an avoidance system that:
    generates strips for a path of an object;
    positions the strips relative to the path of the object, the object being in space, such that the strips:
       comprise parameters that obscure an identification of the path of the object;
       make a location of the object unidentifiable;
       are positioned such that at least a portion of the path of the object is covered by the strips in which at least a portion of the strips overlap each other, and further comprising: and
       form avoidance data; and
    sends the avoidance data at jittered time intervals to a platform;
    comprises an avoidance data generator identifying minimum strip dimensions via receiving an unprocessed movement vector for the object and computing a satellite perturbation vector uncertainty along an object movement vector over time, forming a propagated position;
    determines, using the avoidance data generator, if a first strip and a second strip are within a connectivity range of each other;
    changes an angular distance of the connectivity range;
    compares a physical property of the first strip and a physical property of the second strip to a physical property of strips previously transmitted by the avoidance data generator to the platform;
    changes the first strip due to the physical property of the first strip being within a range of the physical property of strips previously transmitted by the avoidance data generator to the platform;
    changes the second strip due to the physical property of the second strip being within the range of the physical property of strips previously transmitted by the avoidance data generator to the platform; and
    sends a changed strip to the platform.

15. The object avoidance system of claim 14, wherein the parameters comprise at least one of dimensions and orientations.

16. The object avoidance system of claim 14, wherein the platform comprises a directed energy system.

17. The object avoidance system of claim 14, wherein the platform comprises an imaging system.

18. The object avoidance system of claim 14, wherein each strip is valid for a period of time respectively, such that some overlap exists between the period of time for each respective strip that shares an overlapping region.

19. The object avoidance system of claim 18, wherein the period of time is valid while the object is within the strip.

20. The object avoidance system of claim 14, wherein the portion of the strips overlaps the each other in time.

21. The object avoidance system of claim 14, wherein the portion of the strips overlaps the each other in orientation.

22. A method for operating a platform, the method comprising:
   receiving, at jittered time intervals, avoidance data defining strips generated for a path of an object, the object being in space, such that the strips are positioned relative to the path of the object, and the strips comprising parameters obscuring an identification of the path of the object, make a location of the object unidentifiable, and form the avoidance data;
   operating the platform using the avoidance data such that operating the platform using the avoidance data comprises:
      operating a directed energy system in a direction outside of the strips in the avoidance data, and receiving avoidance data further comprises:
      an avoidance data generator identifying minimum strip dimensions via receiving an unprocessed movement vector for the object and computing a satellite perturbation vector uncertainty along an object movement vector over time, forming a propagated position;
      determining, using the avoidance data generator, if a first strip and a second strip are within a connectivity range of each other;
      changing an angular distance of the connectivity range;
      comparing a physical property of the first strip and a physical property of the second strip to a physical property of strips previously transmitted by the avoidance data generator to the platform;
      changing the first strip due to the physical property of the first strip being within a range of the physical property of strips previously transmitted by the avoidance data generator to the platform;
      changing the second strip due to the physical property of the second strip being within the range of the physical property of strips previously transmitted by the avoidance data generator to the platform; and
      the avoidance data generator sending a changed strip to the platform.

23. The method of claim 22, wherein operating the platform using the avoidance data comprises:
   operating an imaging system in a direction outside of the strips in the avoidance data.

24. An apparatus comprising a platform that configured to:
   receives, at jittered time intervals, avoidance data defining strips generated by an avoidance data generator, for a path of an object, such that the strips are positioned relative to the path of the object, and the strips comprise parameters that obscure an identification of the path of the object, make a location of the object unidentifiable, form the avoidance data, and such that a physical property of each respective strip has been compared to a physical property of strips previously received by the avoidance data generator to the platform, such that the avoidance data generator:
      identifies minimum strip dimensions via receiving an unprocessed movement vector for the object and computing a satellite perturbation vector uncertainty along an object movement vector over time, forming a propagated position; and
      determines if a first strip and a second strip are within a connectivity range of each other;
      changes an angular distance of the connectivity range;
      compares a physical property of the first strip and a physical property of the second strip to a physical property of strips previously transmitted by the avoidance data generator to the platform;
      changes the first strip due to the physical property of the first strip being within a range of the physical property of strips previously transmitted by the avoidance data generator to the platform;
      changes the second strip due to the physical property of the second strip being within the range of the physical property of strips previously transmitted by the avoidance data generator to the platform; and
      sends a changed strip to the platform; and
   operates using the avoidance data.

25. The apparatus of claim 24, wherein the platform includes at least one of: a directed energy system, and an imaging system.

* * * * *